US012766849B2

(12) United States Patent
Hirabayashi et al.

(10) Patent No.: US 12,766,849 B2
(45) Date of Patent: Oct. 20, 2026

(54) LIQUID CIRCULATION DEVICE, ADJUSTING METHOD OF LIQUID CIRCULATION DEVICE, AND MANUFACTURING METHOD OF IMAGE FORMING APPARATUS

(71) Applicant: FUJIFILM Corporation, Tokyo (JP)

(72) Inventors: Yasutoshi Hirabayashi, Kanagawa (JP); Ryohei Yoshinaga, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 120 days.

(21) Appl. No.: 18/829,305

(22) Filed: Sep. 10, 2024

(65) Prior Publication Data

US 2025/0091359 A1 Mar. 20, 2025

(30) Foreign Application Priority Data

Sep. 14, 2023 (JP) ................................ 2023-149157

(51) Int. Cl.
*B41J 2/18* (2006.01)
*B41J 2/175* (2006.01)

(52) U.S. Cl.
CPC ............. *B41J 2/18* (2013.01); *B41J 2/17596* (2013.01); *B41J 2202/12* (2013.01)

(58) Field of Classification Search
CPC .... B41J 2002/14419; B41J 2002/14306; B41J 2002/14459; B41J 2002/14362; B41J 2202/20; B41J 2202/07; B41J 2202/12; B41J 2/17563; B41J 2/18; B41J 2/17596; B41J 2/17566; B29C 64/209; F16F 9/512
See application file for complete search history.

(56) References Cited

U.S. PATENT DOCUMENTS 4,614,948 A * 9/1986 Katerberg ................ B41J 2/175 347/89
7,578,567 B2 * 8/2009 Zhang .................. B41J 2/17566 347/7

(Continued)

FOREIGN PATENT DOCUMENTS

DE 102020209304 11/2020
JP 2018099858 6/2018

OTHER PUBLICATIONS

"Search Report of Europe Counterpart Application", issued on Jan. 27, 2025, pp. 1-10.

*Primary Examiner* — John P Zimmermann
(74) *Attorney, Agent, or Firm* — JCIPRNET

(57) ABSTRACT

Provided are a liquid circulation device, an adjusting method of a liquid circulation device, and a manufacturing method of an image forming apparatus that can appropriately adjust a circulation amount of a liquid. The liquid circulation device includes a supply side manifold that supplies a liquid to a print bar on which one or more liquid jetting heads jetting the liquid are mounted, a collection side manifold that collects the liquid from the print bar, and a bypass flow passage that causes the supply side manifold to communicate with the collection side manifold without going via the print bar, in which the liquid circulates in the liquid jetting head due to a differential pressure between the supply side manifold and the collection side manifold, and the bypass flow passage is capable of changing a resistance with respect to the liquid.

12 Claims, 14 Drawing Sheets

(56) References Cited

U.S. PATENT DOCUMENTS

| | | | | |
|---|---|---|---|---|
| 8,733,908 | B2 * | 5/2014 | Borra | B41J 2/17506 347/85 |
| 9,683,625 | B2 * | 6/2017 | Kurita | F16F 9/512 |
| 10,173,436 | B2 * | 1/2019 | Yoshida | B41J 2/17596 |
| 10,576,749 | B2 | 3/2020 | Moriwaki | |
| 11,267,244 | B2 * | 3/2022 | Kishigami | B41J 2/14233 |
| 2010/0238238 | A1 * | 9/2010 | Yamamoto | B41J 2/18 347/85 |
| 2011/0025760 | A1 * | 2/2011 | Rosati | B41J 11/007 347/85 |
| 2012/0026262 | A1 * | 2/2012 | Shimizu | B41J 2/175 347/93 |
| 2012/0293592 | A1 * | 11/2012 | Hibbard | B41J 2/18 347/92 |
| 2018/0134033 | A1 | 5/2018 | Sawase | |
| 2018/0170066 | A1 | 6/2018 | Ohtsu et al. | |
| 2019/0030904 | A1 * | 1/2019 | Katakura | B41J 2/17596 |
| 2020/0031134 | A1 * | 1/2020 | Mizuno | B41J 2/18 |
| 2023/0302812 | A1 * | 9/2023 | Kyoso | B41J 2/17596 |

* cited by examiner

LIQUID CIRCULATION DEVICE, ADJUSTING METHOD OF LIQUID CIRCULATION DEVICE, AND MANUFACTURING METHOD OF IMAGE FORMING APPARATUS

CROSS-REFERENCE TO RELATED APPLICATION

The present application claims priority under 35 U.S.C § 119 (a) to Japanese Patent Application No. 2023-149157 filed on Sep. 14, 2023, which is hereby expressly incorporated by reference, in its entirety, into the present application.

BACKGROUND OF THE INVENTION

1. Field of the Invention

The present invention relates to a liquid circulation device, an adjusting method of a liquid circulation device and a manufacturing method of an image forming apparatus and particularly to a technique of circulating a liquid in a liquid jetting head.

2. Description of the Related Art

JP2018-099858A describes a printing device that has a flow passage which bypasses an ink jet head in order to remove air bubbles of a supply flow passage and a collection flow passage with respect to the ink jet head having an ink circulation structure.

SUMMARY OF THE INVENTION

Problem 1

A print bar including a liquid jetting head is modularized, and the number of print bars comprised in an image forming apparatus is configured to be variable in some cases. In a liquid supply system enabled by pressure control, in a case where the number of liquid jetting heads changes, the flow rate of the entire device changes.

However, in a case where the circulation amount of a liquid in the entire device changes, there is a problem in which it is necessary to change the type of a pump that supplies the liquid or to adjust parameters for pressure control of the liquid.

Problem 2

In a circulation type liquid jetting head, due to variations in a flow passage resistance of the liquid jetting head, variations occur in a circulation amount of a liquid flowing in the liquid jetting head, and particularly, variations in a total circulation amount are large in the print bar in which a plurality of liquid jetting heads are arranged.

On the other hand, an abnormality of the liquid supply system is detected, and deterioration of the pump is detected in an operation state of the pump.

However, since the flow passage resistance of the entire print bar varies depending on an individual difference of the liquid jetting heads, it is necessary to widen a threshold value of abnormality detection, and there is a problem in which a small change in the circulation amount cannot be detected.

In the printing device described in JP2018-099858A, problems 1 and 2 cannot be solved.

In order to solve at least one of the plurality of problems, the present invention is devised in view of such circumstances, and an object thereof is to provide a liquid circulation device, an adjusting method of a liquid circulation device, and a manufacturing method of an image forming apparatus that can appropriately adjust a circulation amount of a liquid.

According to a first aspect of the present disclosure, in order to achieve the object, there is provided a liquid circulation device comprising a supply side manifold that supplies a liquid to a print bar on which one or more liquid jetting heads jetting the liquid are mounted, a collection side manifold that collects the liquid from the print bar, and a bypass flow passage that causes the supply side manifold to communicate with the collection side manifold without going via the print bar and that is capable of changing a resistance with respect to the liquid, in which the liquid circulates in the liquid jetting head due to a differential pressure between the supply side manifold and the collection side manifold.

According to a second aspect of the present disclosure, in the liquid circulation device according to the first aspect, it is preferable that the print bar includes a plurality of the liquid jetting heads, and it is preferable that the plurality of liquid jetting heads are disposed along one direction.

According to a third aspect of the present disclosure, in the liquid circulation device according to the first aspect or the second aspect, it is preferable that in a case where a maximum number of the liquid jetting heads mountable on the print bar is defined as an integer n, the resistance of the bypass flow passage is 1/n times or more and 1 time or less a resistance of the liquid jetting head with respect to the liquid.

According to a fourth aspect of the present disclosure, in the liquid circulation device according to any one of the first aspect to the third aspect, it is preferable that the resistance of the bypass flow passage is changed according to the number of the liquid jetting heads.

According to a fifth aspect of the present disclosure, in the liquid circulation device according to any one of the first aspect to the fourth aspect, it is preferable that a pump that generates the differential pressure between the supply side manifold and the collection side manifold is further comprised, and it is preferable that the resistance of the bypass flow passage is changed according to an output value of the pump.

According to a sixth aspect of the present disclosure, in the liquid circulation device according to any one of the first aspect to the fifth aspect, it is preferable that a flowmeter that measures a flow rate of the liquid flowing to the supply side manifold is further comprised, and it is preferable that the resistance of the bypass flow passage is changed according to the measured flow rate.

According to a seventh aspect of the present disclosure, in the liquid circulation device according to any one of the first aspect to the sixth aspect, it is preferable that the resistance of the bypass flow passage is changed such that an output value of the pump is set to a value within ±5% of an output value determined in advance.

According to an eighth aspect of the present disclosure, in the liquid circulation device according to any one of the first aspect to the seventh aspect, it is preferable that a pump that generates the differential pressure between the supply side manifold and the collection side manifold and a flowmeter that measures an amount of the liquid flowing to the supply side manifold and/or the collection side manifold are further comprised, and it is preferable that the resistance of the bypass flow passage is changed such that a flow rate of the liquid is set to a value within ±5% of a flow rate determined in advance.

According to a ninth aspect of the present disclosure, in the liquid circulation device according to the first aspect to the eighth aspect, it is preferable that a notification device that gives a notification that a flow rate of the liquid flowing to the supply side manifold has exceeded a threshold value determined in advance is comprised. The threshold value is, for example, ±10% of the flow rate determined in advance.

According to a tenth aspect of the present disclosure, in the liquid circulation device according to the first aspect to the ninth aspect, it is preferable that the bypass flow passage includes a bypass flow passage valve, and it is preferable that the resistance of the bypass flow passage is changed by the bypass flow passage valve.

According to an eleventh aspect of the present disclosure, in order to achieve the object, there is provided a manufacturing method of an image forming apparatus including a print bar on which a liquid jetting head jetting a liquid is mounted and of which a maximum number of mountable liquid jetting heads is an integer n, a supply side manifold that supplies the liquid to the print bar, a collection side manifold that collects the liquid from the print bar, a bypass flow passage that causes the supply side manifold to communicate with the collection side manifold without going via the print bar and that is capable of changing a resistance with respect to the liquid, and a pump that generates a differential pressure between the supply side manifold and the collection side manifold, the manufacturing method comprising a step of mounting m liquid jetting heads on the print bar in a case where m is defined as an integer of 1 or more and less than n and a step of setting the resistance to $1/(n-m)$ of a resistance of the liquid jetting head.

According to a twelfth aspect of the present disclosure, in order to achieve the object, there is provided an adjusting method of a liquid circulation device including a supply side manifold that supplies a liquid to a print bar on which a liquid jetting head jetting the liquid is mounted, a collection side manifold that collects the liquid from the print bar, a bypass flow passage that causes the supply side manifold to communicate with the collection side manifold without going via the print bar and that is capable of changing a resistance with respect to the liquid, and a pump that generates a differential pressure between the supply side manifold and the collection side manifold, the adjusting method comprising closing the bypass flow passage, measuring an output value of the pump, and setting the resistance according to the output value.

With the present invention, the amount of the circulating liquid can be appropriately adjusted.

DESCRIPTION OF THE PREFERRED EMBODIMENTS

Hereinafter, preferable embodiments of the present invention will be described in detail with reference to the accompanying drawings.

Image Forming Apparatus

Figure 1:
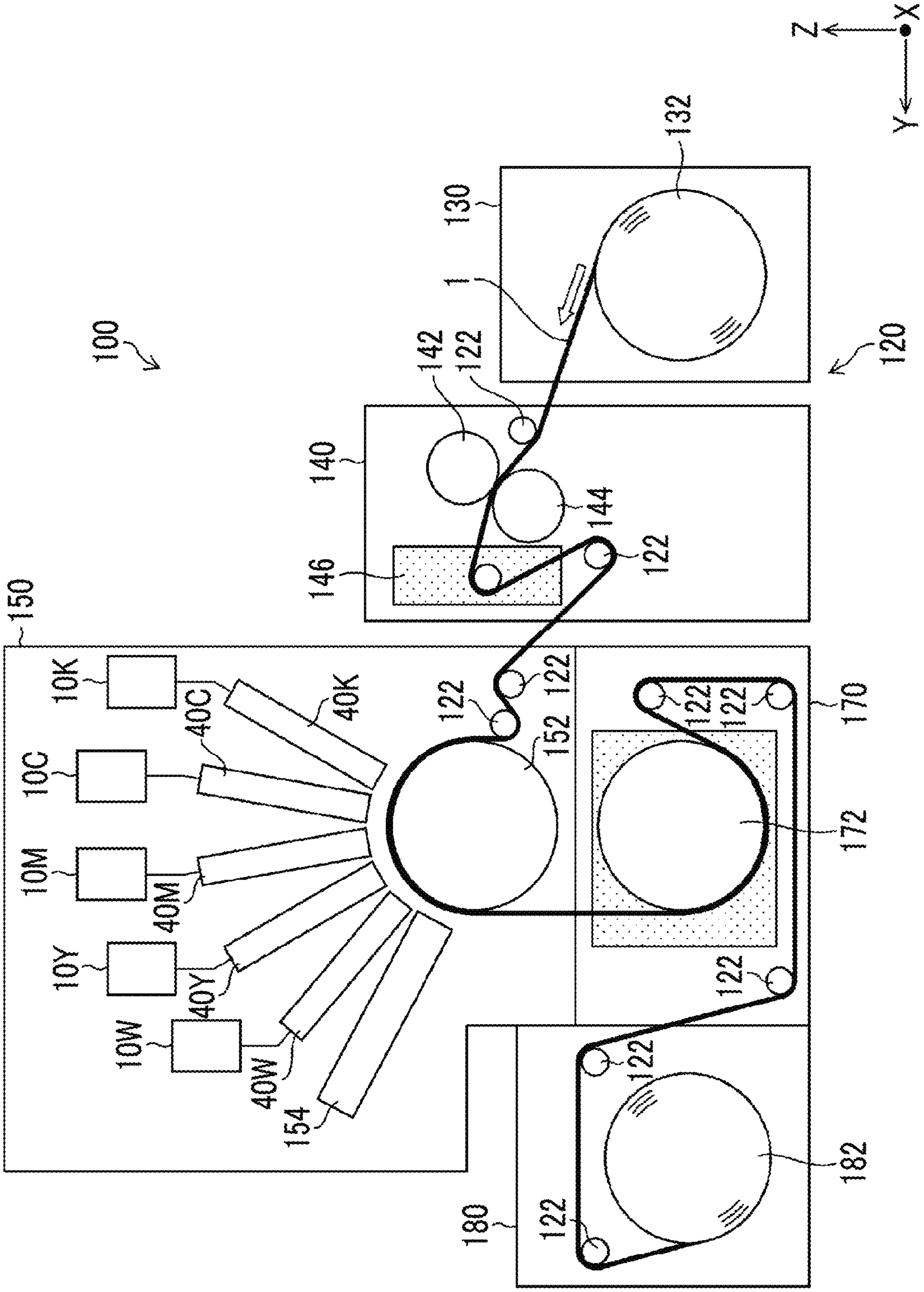
FIG. 1 is a configuration view of an image forming apparatus.

FIG. 1 is a configuration view of an image forming apparatus. An image forming apparatus 100 is an apparatus that prints an image (an example of "forming") on a web-like printing medium 1 through a single-pass method.

The printing medium 1 is, for example, general-purpose printing paper. The general-purpose printing paper is not so-called ink jet dedicated paper but refers to paper mainly made of cellulose, such as coated paper used in general offset printing or the like. The width of the printing medium 1 is a length in a direction orthogonal to a moving direction of the printing medium 1. The moving direction of the printing medium 1 is an arrow direction in FIG. 1. The image forming apparatus 100 may be capable of printing on the printing medium 1 having any width.

In addition, an image includes a photograph, a picture, a character, and a symbol.

As shown in FIG. 1, the image forming apparatus 100 comprises a transport device 120, a feeding device 130, a pretreatment liquid coating device 140, a liquid applying device 150, a drying device 170, and a winding device 180.

Transport Device

The transport device 120 transports the printing medium 1 from the feeding device 130 to the winding device 180 along a transport path. The transport device 120 corresponds to a moving mechanism that relatively moves the printing medium 1 and a liquid jetting head to be described below. The transport device 120 comprises a plurality of pass rollers 122. The pass rollers 122 function as guide rollers that support the printing medium 1 in the transport path of the printing medium 1. The transport device 120 guides the printing medium 1 unwound from the feeding device 130 with the plurality of pass rollers 122 and transports the printing medium 1 to the feeding device 130, the pretreatment liquid coating device 140, the liquid applying device 150, the drying device 170, and the winding device 180 in this order.

Feeding Device

The feeding device 130 comprises a feeding roll 132. The feeding roll 132 comprises a reel (not shown) that is rotatably supported. The printing medium 1 before an image is printed is wound around the reel in a roll shape.

Winding Device

The winding device 180 comprises a winding roll 182. The winding roll 182 comprises a reel (not shown) that is rotatably supported. One end of the printing medium 1 is connected to the reel. The winding roll 182 comprises a winding motor (not shown) that rotationally drives the reel.

Pretreatment Liquid Coating Device

The pretreatment liquid coating device 140 coats a printing surface of the printing medium 1 with a pretreatment liquid. The pretreatment liquid is a liquid containing a component that aggregates or insolubilizes a coloring material component in an aqueous liquid to thicken the aqueous liquid. The pretreatment liquid coating device 140 comprises a coating roller 142, an opposing roller 144, and a pretreatment liquid drying device 146. The printing medium 1 transported from the feeding device 130 is guided by the pass roller 122 and is transported to a position opposing the coating roller 142. In the pretreatment liquid coating device 140, the printing medium 1 is sandwiched between the coating roller 142 having an outer circumferential surface to which the pretreatment liquid is supplied and the opposing roller 144, and the printing surface of the printing medium 1 is coated with the pretreatment liquid on the outer circumferential surface of the coating roller 142. The pretreatment liquid drying device 146 performs drying treatment on the printing medium 1 coated with the pretreatment liquid. The pretreatment liquid drying device 146 blows hot air to the printing medium 1 with a hot air heater (not shown).

Liquid Applying Device

The liquid applying device 150 applies a liquid to the printing surface of the printing medium 1 to print a color image. The liquid applying device 150 comprises print bars 40K, 40C, 40M, 40Y, and 40W. The print bars 40K, 40C, 40M, 40Y, and 40W jet black, cyan, magenta, yellow, and white liquids, respectively. As the print bars 40K, 40C, 40M, 40Y, and 40W, print bars 40 to be described below can be used, respectively.

A liquid used in the liquid applying device 150 is an ink for image formation. The ink may be an aqueous ink, a UV curable-type ink, or the like. In addition, the ink may have a low viscosity or may have a high viscosity.

The liquid applying device 150 comprises liquid circulation devices 10K, 10C, 10M, 10Y, and 10W. As the liquid circulation devices 10K, 10C, 10M, 10Y, and 10W, a liquid circulation device 10, a liquid circulation device 10A, or a liquid circulation device 10B, each of which is to be described later, can be used. The liquid circulation devices 10K, 10C, 10M, 10Y, and 10W circulate liquids of colors corresponding to the print bars 40K, 40C, 40M, 40Y, and 40W, respectively, therein.

The liquid applying device 150 comprises a printing drum 152 and a scanner 154. The printing drum 152 comprises an adsorption hole (not shown) in an outer circumferential surface thereof. The printing drum 152 causes the printing medium 1 to be adsorbed to the outer circumferential surface by sucking the printing medium 1 from the inside via the adsorption hole and transports the printing medium 1 by rotating. The liquid applying device 150 prints a color image on the printing surface of the printing medium 1 by jetting liquids of respective colors from the print bars 40K, 40C, 40M, 40Y, and 40W to the printing medium 1 transported directly downward by the printing drum 152.

The scanner 154 comprises an imaging device that captures an image such as a test image printed on the printing surface of the printing medium 1 and that generates an imaging signal corresponding to the image. As the imaging device, a color charge coupled device (CCD) linear image sensor or a color complementary metal oxide semiconductor (CMOS) linear image sensor can be used.

Drying Device

The drying device 170 comprises a drying drum 172. The drying drum 172 comprises an adsorption hole (not shown) in an outer circumferential surface thereof. The drying drum 172 causes the printing medium 1 to be adsorbed to the outer circumferential surface by sucking the printing medium 1 from the inside via the adsorption hole and transports the printing medium 1 by rotating. The drying device 170 blows hot air from a hot air heater (not shown) toward the printing surface of the printing medium 1 transported by the drying drum 172 and dries the printing surface of the printing medium 1.

First Embodiment

Liquid Circulation Device

Figure 2:
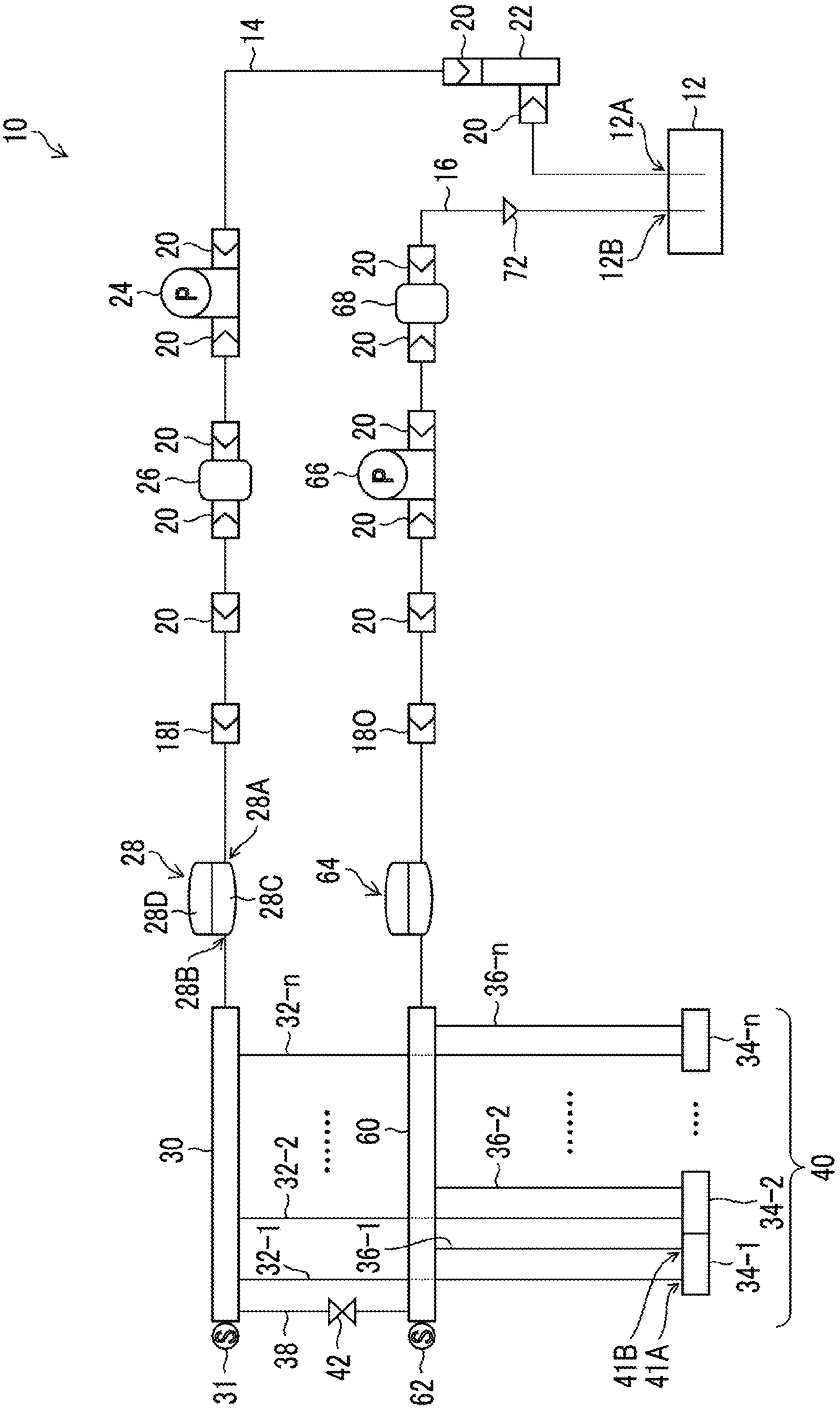
FIG. 2 is a configuration view of a liquid circulation device.

FIG. 2 is a configuration view showing a liquid circulation device according to a first embodiment. The liquid circulation device 10 is a device that circulates a liquid to the print bar 40. As shown in FIG. 2, the liquid circulation device 10 comprises a liquid tank 12, a supply side flow passage 14, a collection side flow passage 16, a joint 18I, a joint 18O, a supply side back-pressure tank 28, a supply side pressure sensor 31, a collection side pressure sensor 62, and a collection side back-pressure tank 64.

The liquid tank 12 stores a liquid circulated by the liquid circulation device 10. The liquid tank 12 comprises a supply port 12A and a collection port 12B. The supply port 12A communicates with the supply side flow passage 14, and the collection port 12B communicates with the collection side flow passage 16.

The supply side flow passage 14 causes a liquid to flow from the liquid tank 12 to the liquid circulation device 10. The collection side flow passage 16 causes the liquid to flow from the liquid tank 12 to the liquid circulation device 10.

The supply side flow passage 14 and the collection side flow passage 16 are composed of a flow passage configuring member such as a tube. The supply side flow passage 14 causes the liquid tank 12 to communicate with the liquid circulation device 10 via the joint 18I. The collection side flow passage 16 causes the liquid circulation device 10 to communicate with the liquid tank 12 via the joint 18O.

Each joint 20 causes the supply side flow passage 14 to communicate with a degassing module 22, a supply side pump 24, and a supply side filter 26.

The degassing module 22 performs degassing treatment on a liquid passing through the supply side flow passage 14.

The supply side pump 24 applies a pressure to a liquid inside the supply side flow passage 14, generates a flow of the liquid inside the supply side flow passage 14, and supplies a liquid stored in the liquid tank 12 to the liquid circulation device 10. As the supply side pump 24, for example, a tube pump can be applied. The supply side filter 26 removes air bubbles, foreign substances, and the like contained in the liquid.

An output value of the supply side pump 24 and the amount of a liquid supplied to the supply side flow passage 14 have a certain relationship. The output value of the supply side pump 24 is the rotation speed of the supply side pump 24 per unit time. The supply side pump 24 is configured to be capable of monitoring the output value. The certain relationship may be a positive proportional relationship or a positive correlation.

A collection side pump 66 and a collection side filter 68 are provided in the collection side flow passage 16 by the joints 20, respectively.

The collection side pump 66 applies a pressure to a liquid inside the collection side flow passage 16, generates a flow of the liquid inside the collection side flow passage 16, and collects a liquid supplied to the liquid circulation device 10 in the liquid tank 12. As the collection side pump 66, for example, a tube pump can be applied. The collection side filter 68 removes air bubbles, foreign substances, and the like contained in the liquid.

An output value of the collection side pump 66 and the amount of a liquid collected from the collection side flow passage 16 have a certain relationship. The output value of the collection side pump 66 is the rotation speed of the collection side pump 66 per unit time. The collection side pump 66 is configured to be capable of monitoring the output value. The certain relationship may be a positive proportional relationship or a positive correlation.

In addition, a one-way valve 72 is provided in the collection side flow passage 16. The one-way valve 72 allows only a flow of a liquid from a liquid circulation device 10 side to a liquid tank 12 side and restricts a flow of the liquid from the liquid tank 12 side to the liquid circulation device 10 side.

The supply side back-pressure tank 28 is a pressure buffer device that suppresses fluctuations in internal pressures of the supply side flow passage 14 and the liquid circulation device 10. The supply side back-pressure tank 28 comprises a liquid inlet 28A, a liquid outlet 28B, a liquid chamber 28C, a gas chamber 28D, and an clastic film 28E.

The supply side back-pressure tank 28 communicates with the supply side flow passage 14 via the liquid inlet 28A and the joint 18I. In addition, the supply side back-pressure tank 28 communicates with the liquid circulation device 10 via the liquid outlet 28B. The liquid that has flowed in from the liquid inlet 28A flows out from the liquid outlet 28B via the liquid chamber 28C.

The gas chamber 28D is sealed with air. The elastic film 28E is disposed between the liquid chamber 28C and the gas chamber 28D and separates the liquid chamber 28C and the gas chamber 28D. The elastic film 28E deforms according to pressure fluctuations of a liquid passing through the liquid chamber 28C to reduce the pressure fluctuations of the liquid passing through the liquid chamber 28C.

A liquid that has flowed out from the liquid outlet 28B flows into a supply side manifold 30.

The collection side back-pressure tank 64 is a pressure buffer device that suppresses fluctuations in the internal pressure of the liquid circulation device 10. The configuration of the collection side back-pressure tank 64 is the same as the configuration of the supply side back-pressure tank 28. A liquid flowed into the liquid circulation device 10 flows out to the outside of the liquid circulation device 10 via the collection side back-pressure tank 64 and the joint 18O.

The liquid circulation device 10 comprises the supply side manifold 30, liquid supply flow passages 32-1, 32-2, . . . , and **32-*n*, liquid jetting heads 34-1, 34-2, . . . , and 34-*n*, liquid collection flow passages 36-1, 36-2, . . . , and 36-*n*, a bypass flow passage 38, the print bar 40, and a collection side manifold 60. In a case where the plurality of liquid supply flow passages 32-1, 32-2, . . . , and 32-*n* are not distinguished from each other, the plurality of liquid supply flow passages 32-1, 32-2, . . . , and 32-*n* are also referred to as a liquid supply flow passage 32. In a case where the plurality of liquid jetting heads 34-1, 34-2, . . . , and 34-*n* are not distinguished from each other, the plurality of liquid jetting heads 34-1, 34-2, . . . , and 34-*n* are also referred to as a liquid jetting head 34. In a case where the plurality of liquid collection flow passages 36-1, 36-2, . . . , and 36-*n* are not distinguished from each other, the plurality of liquid collection flow passages 36-1, 36-2, . . . , and 36-*n* are also referred to as a liquid collection flow passage 36**.

The print bar 40 is a line type head having a structure in which the plurality of liquid jetting heads 34-1, 34-2, . . . , and **34-*n* that jet liquids respectively are joined along one direction. The liquid jetting heads 34-1, 34-2, . . . , and 34-*n* may be disposed in a straight line along one direction or may be disposed in a zigzag shape along one direction. The print bar 40 may be composed of only one liquid jetting head 34**.

The liquid jetting heads 34-1, 34-2, . . . , and **34-*n* each comprise a liquid supply port 41A and a liquid collection port 41B. The print bar 40 comprises the liquid supply flow passages 32-1, 32-2, . . . , and 32-*n*. The liquid supply flow passages 32-1, 32-2, . . . , and 32-*n* are caused to communicate with the liquid supply ports 41A of the liquid jetting heads 34-1, 34-2, . . . , and 34-*n*, respectively. The supply side manifold 30 communicates with the liquid supply ports 41A of the liquid jetting heads 34-1, 34-2, . . . , and 34-*n* via the liquid supply flow passages 32-1, 32-2, . . . , and 32-*n*, respectively. A liquid flowed into the supply side manifold 30 flows into the liquid jetting heads 34-1, 34-2, . . . , and 34-*n* via the liquid supply ports 41**A.

The liquid supply flow passages 32-1, 32-2, . . . , and **32-*n* each comprise a supply valve (not shown) and a supply damper (not shown). The supply valve switches between the communication and blocking of each of the liquid supply flow passages 32-1, 32-2, . . . , and 32-*n*. The supply damper absorbs the pressure fluctuations of the liquid flowing in each of the liquid supply flow passages 32-1, 32-2, . . . , and 32-*n***.

The print bar 40 comprises the liquid collection flow passages 36-1, 36-2, . . . , and **36-*n*. The liquid collection flow passages 36-1, 36-2, . . . , and 36-*n* are caused to communicate with the liquid collection ports 41B of the liquid jetting heads 34-1, 34-2, . . . , and 34-*n*, respectively. The collection side manifold 60 communicates with the liquid collection ports 41B of the liquid jetting heads 34-1, 34-2, . . . , and 34-*n* via the liquid collection flow passages 36-1, 36-2, . . . , and 36-*n***, respectively.

A liquid that has flowed into the liquid jetting heads 34-1, 34-2, . . . , and **34-*n* flows into the collection side manifold 60 via the liquid collection flow passages 36-1, 36-2, . . . , and 36-*n***.

The liquid collection flow passages 36-1, 36-2, . . . , and **36-*n* each comprise a collection damper (not shown) and a collection valve (not shown). The collection damper absorbs pressure fluctuations of a liquid flowing in the liquid collection flow passages 36-1, 36-2, . . . , and 36-*n*. The collection valve switches between the communication and blocking of each of the liquid collection flow passages 36-1, 36-2, . . . , and 36-*n***.

The bypass flow passage 38 causes the supply side manifold 30 to communicate with the collection side manifold 60 without going via the print bar 40. A plurality of bypass flow passages 38 may be provided. A bypass flow passage valve 42 that opens and closes the bypass flow passage 38 is provided in the bypass flow passage 38. In a case where the plurality of bypass flow passages 38 are comprised, the bypass flow passage valve 42 may be provided in each of the bypass flow passages 38.

The supply side pressure sensor 31 detects an internal pressure of the supply side manifold 30. As the supply side pressure sensor 31, a sensor of a semiconductor piezoresistive type, a capacitive type, a silicon resonant type, or the like can be used.

The collection side pressure sensor 62 detects an internal pressure of the collection side manifold 60. As in the supply side pressure sensor 31, a sensor of a semiconductor piezoresistive type, a capacitive type, a silicon resonant type, or the like can be used as the collection side pressure sensor 62.

With the liquid circulation device 10 configured as described above, the supply side manifold 30 is set to a pressure by the supply side pump 24. In addition, the collection side manifold 60 is set to a pressure by the collection side pump 66. The pressure set in the supply side manifold 30 is relatively higher than the pressure set in the collection side manifold 60. A difference between the pressure set in the supply side manifold 30 and the pressure set in the collection side manifold 60 is a differential pressure.

The liquid circulation device 10 circulates a liquid to the plurality of liquid jetting heads 34 using a differential pressure between the supply side manifold 30 and the collection side manifold 60. In the liquid circulation device 10, the amount of the liquid circulating in each liquid jetting head 34 is set according to the value of the differential pressure.

Liquid Jetting Head

Figure 3:
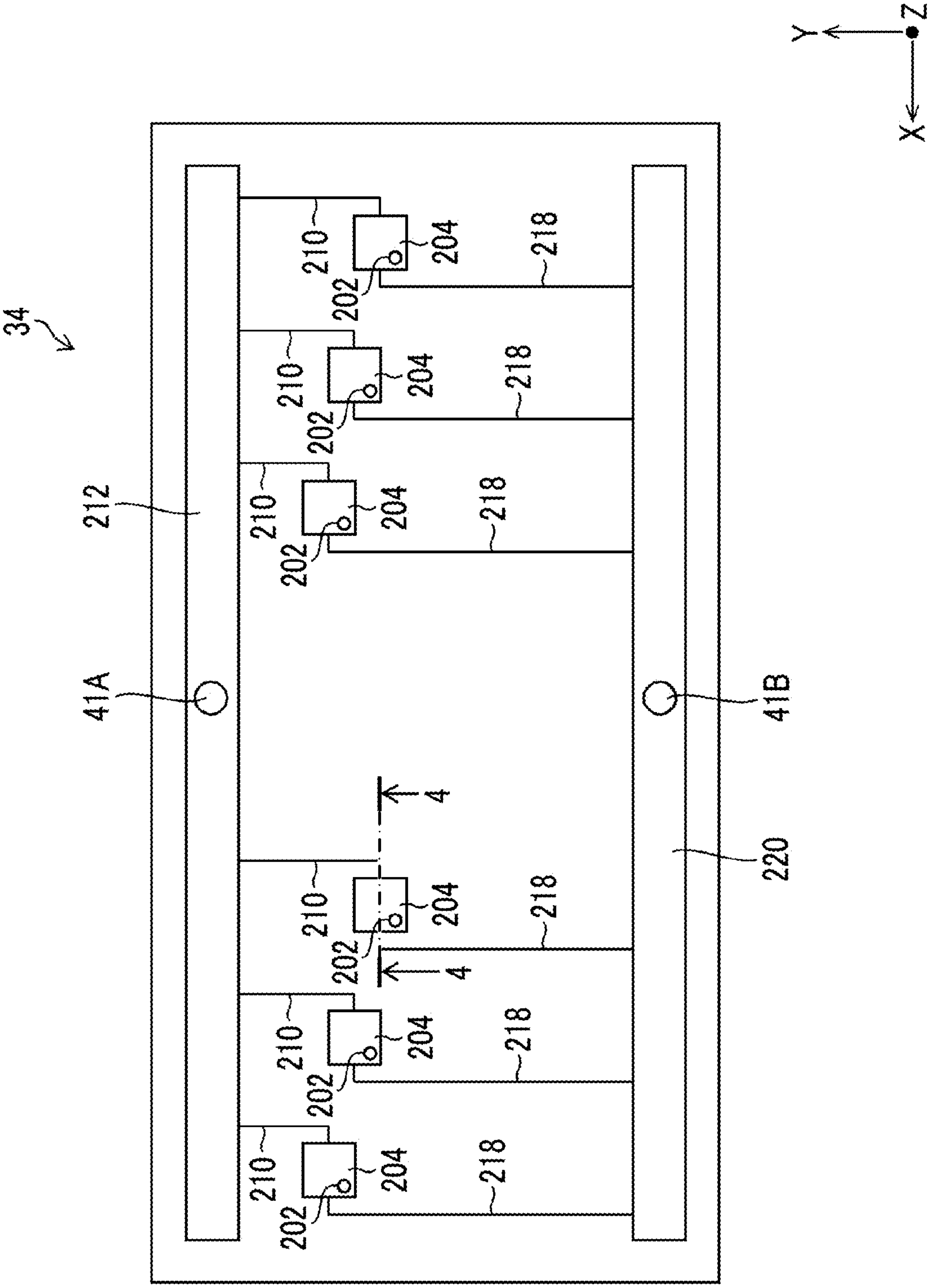
FIG. 3 is a plan perspective view showing a structural example of a liquid jetting head.

FIG. 3 is a plan perspective view showing a structural example of the liquid jetting head. As shown in FIG. 3, the liquid jetting head 34 comprises a plurality of nozzles 202. The plurality of nozzles 202 are disposed two-dimensionally. The disposition of the nozzles 202 is not limited to being two-dimensional.

The plurality of nozzles 202 communicate with pressure chambers 204, respectively. The pressure chambers 204 communicate with supply tributaries 210. The supply tributaries 210 communicate with a common flow passage 212. The common flow passage 212 communicates with the liquid supply port 41A.

Figure 4:
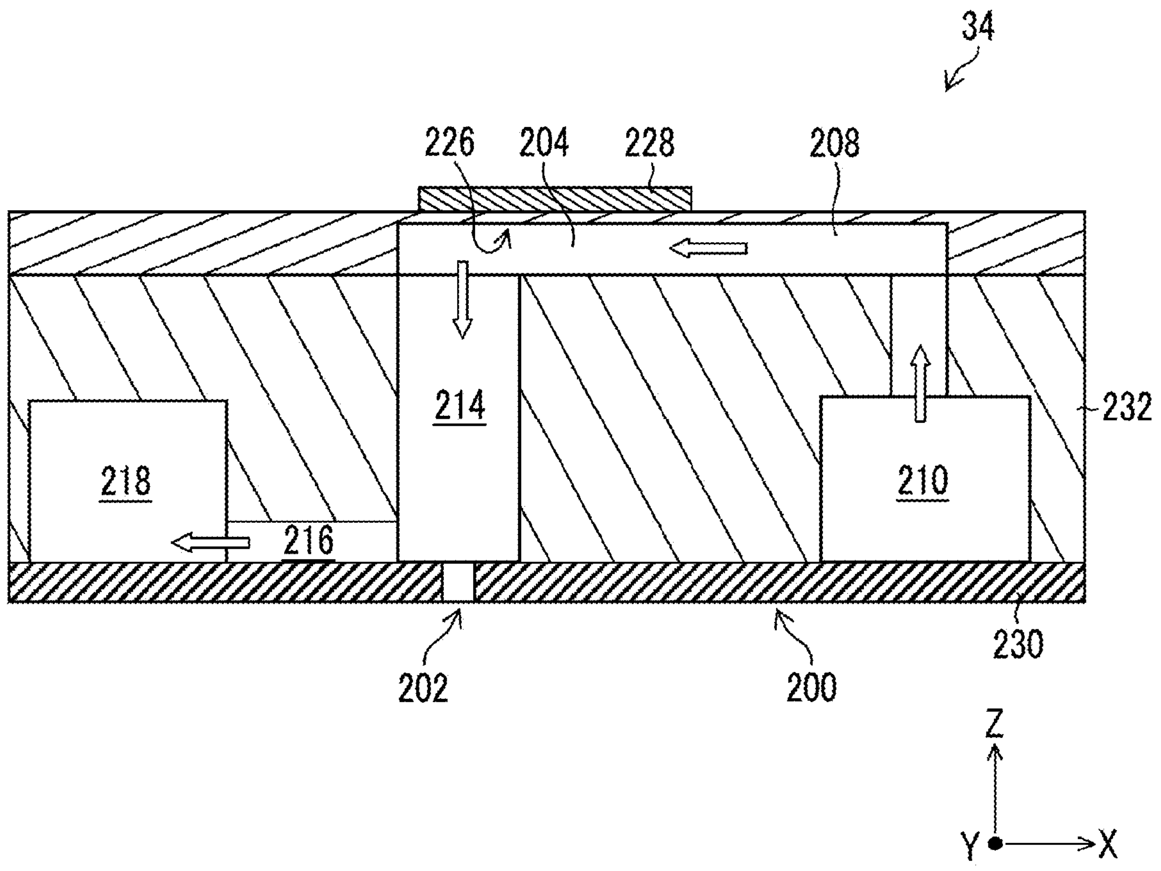
FIG. 4 is a cross-sectional view taken along line 4-4 of FIG. 3.

In addition, each nozzle 202 communicates with a collection tributary 218 via a liquid circulation path 216 (see FIG. 4). The collection tributary 218 communicates with a circulation common flow passage 220. The circulation common flow passage 220 communicates with the liquid collection port 41B.

FIG. 4 is a cross-sectional view taken along line 4-4 of FIG. 3. As shown in FIG. 4, the liquid jetting head 34 comprises a nozzle plate 230, a flow passage plate 232, and an actuator 228. The liquid jetting head 34 has a structure in which the nozzle plate 230, the flow passage plate 232, and the actuators 228 are laminated in this order.

The plurality of nozzles 202 are formed in the nozzle plate 230. The nozzles 202 each have an opening formed in a nozzle surface 200 and has a structure that penetrates the nozzle plate 230.

In the flow passage plate 232, the pressure chamber 204, a supply stop 208, the supply tributary 210, the common flow passage 212, a downcomer 214, the liquid circulation path 216, the collection tributary 218, and the circulation common flow passage 220 are formed.

The nozzle 202 communicates with the pressure chamber 204 via the downcomer 214. The pressure chamber 204 communicates with the supply tributary 210 via the supply stop 208. In addition, the nozzle 202 communicates with the collection tributary 218 via the liquid circulation path 216.

A liquid flows in the common flow passage 212, the supply tributary 210, the supply stop 208, the pressure chamber 204, and the downcomer 214, and some of the liquid is jetted from each nozzle 202. The liquid that is not jetted from the nozzle 202 is discharged via the liquid circulation path 216, the collection tributary 218, and the circulation common flow passage 220.

It is preferable that the liquid circulation path 216 has a configuration of being disposed at a periphery of the nozzle 202. Herein, the liquid circulation path 216 is disposed in a region communicating with the downcomer 214, the region of the flow passage plate 232 being in contact with the nozzle plate 230. Accordingly, a liquid in the vicinity of the nozzle 202 can be circulated, the thickening of the liquid inside the nozzle 202 is suppressed, and stable jetting by the liquid jetting head 34 is realized.

The actuator 228 is disposed on a top surface of the pressure chamber 204, which is a vibration plate 226 also serving as a common electrode. The actuator 228 is a piezoelectric element comprising a piezoelectric layer (not shown) and an individual electrode (not shown).

The actuator 228 bends and deforms in response to the application of a drive voltage to the individual electrode. The pressure chamber 204 is deformed by the deformation of the actuator 228, and a liquid is jetted from the nozzle 202 in response to the contraction of the pressure chamber 204. In addition, in response to the expansion of the pressure chamber 204 after the liquid is jetted from the nozzle 202, a new liquid is supplied to the pressure chamber 204 from the common flow passage 212 through the supply tributary 210 and the supply stop 208.

Herein, although a piezoelectric method is given as an example of a liquid jetting method, a thermal method or an electrostatic method may be used as the liquid jetting method.

Head Module

Figure 5:
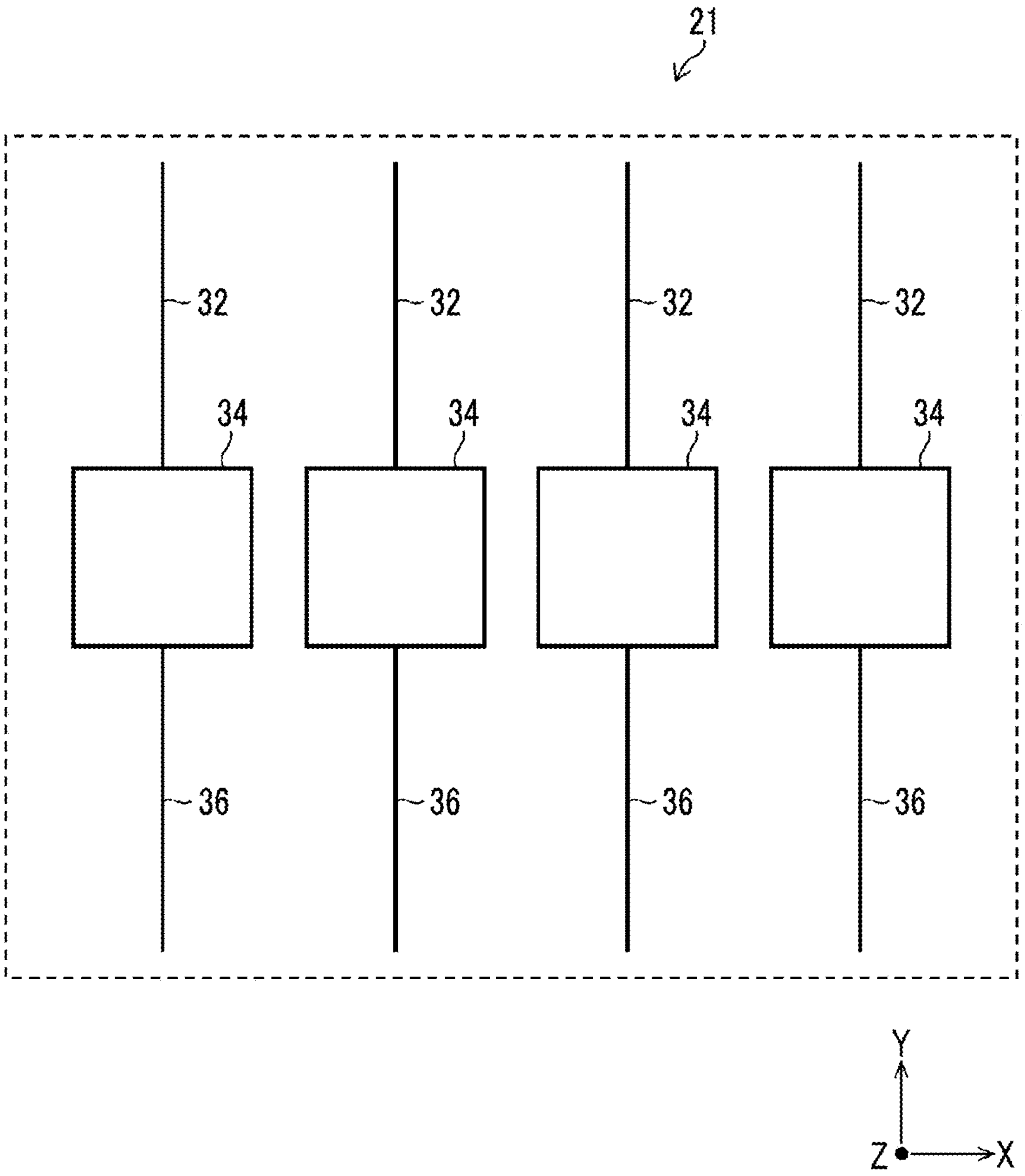
FIG. 5 is a configuration view of a head module.

The plurality of liquid jetting heads 34 may constitute one head module. FIG. 5 is a configuration view of the head module. A head module 21 shown in FIG. 5 comprises four liquid jetting heads 34. In each of the four liquid jetting heads 34, the liquid supply flow passage 32 and the liquid collection flow passage 36 communicate with each other. The four liquid jetting heads 34 may be disposed in a zigzag shape. The number of liquid jetting heads 34 comprised in the head module 21 is not limited to four.

Figure 6:
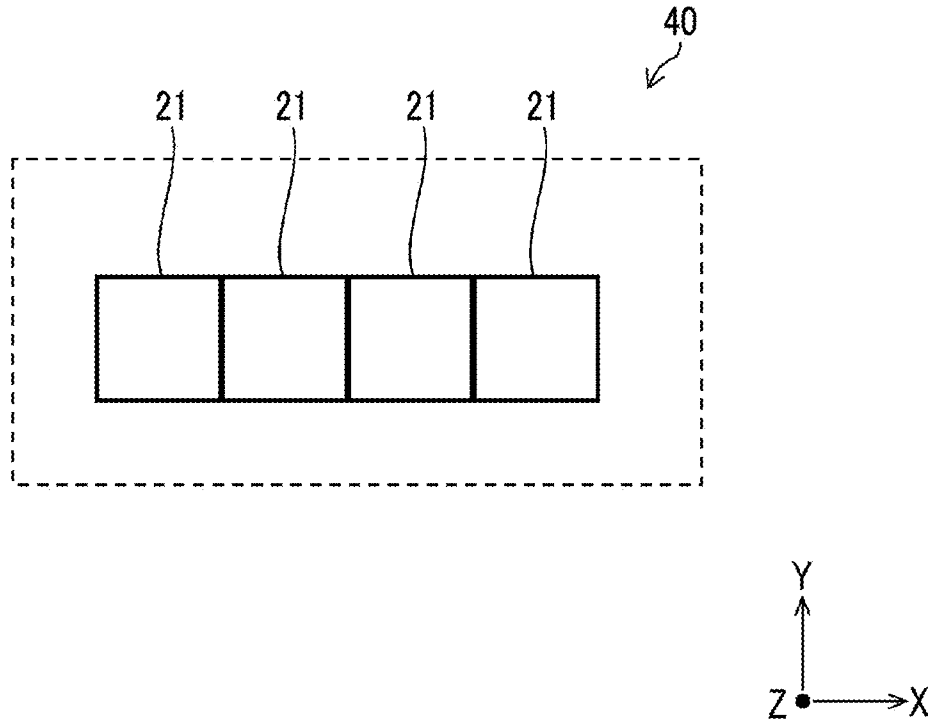
FIG. 6 is a configuration view of a print bar.

FIG. 6 is a configuration view of the print bar. The print bar 40 shown in FIG. 6 comprises four head modules 21. The head modules 21 may be disposed in a zigzag shape. The number of head modules 21 comprised in the print bar 40 is not limited to four.

The liquid circulation device 10 can extend the print bar 40 by connecting the head modules 21 in an X-direction. By using the head modules 21 in the liquid circulation device 10, maintenance work and design work are facilitated. With the extension of the print bar 40, the lengths of the supply side manifold 30 and the collection side manifold 60 in the X-direction may be changeable or may be extendable in the X-direction. In addition, the supply side manifold 30 and the collection side manifold 60 may have a structure in which a plurality of manifolds are used in series or in parallel.

Resistance of Bypass Flow Passage

Figure 7:
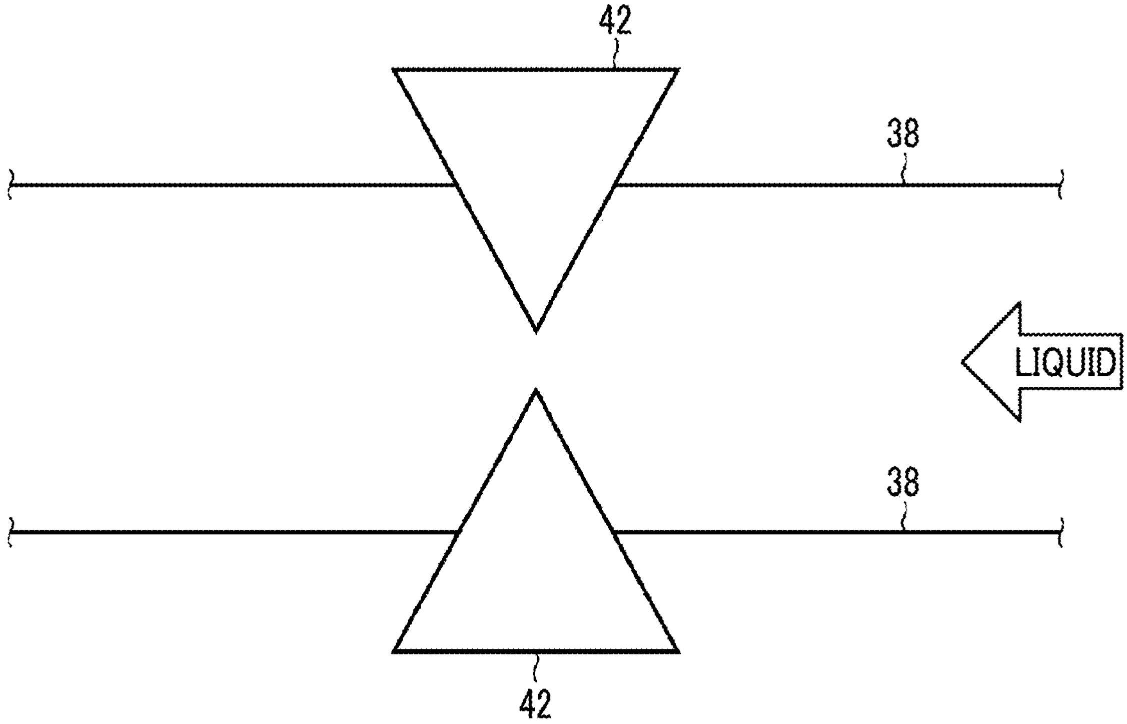
FIG. 7 is a schematic view of a bypass flow passage and a bypass flow passage valve.

FIG. 7 is a schematic view of the bypass flow passage 38 and the bypass flow passage valve 42. The bypass flow passage valve 42 changes the resistance of the bypass flow passage 38 by changing the cross-sectional area of the bypass flow passage 38. The resistance is a resistance that a liquid receives from a pipe line in a case where the liquid flows in the pipe line and is also referred to as a flow passage resistance. The bypass flow passage valve 42 may be operated in response to a control signal or may be manually operated. The bypass flow passage valve 42 may be a needle-shaped valve.

Changing the cross-sectional area of the bypass flow passage 38 to 0 times the maximum cross-sectional area of the bypass flow passage 38 means completely closing the bypass flow passage 38, and the flow passage resistance is infinite. In addition, changing the cross-sectional area of the bypass flow passage 38 to 1 time the maximum cross-sectional area of the bypass flow passage 38 indicates completely opening the bypass flow passage 38. Accordingly, the resistance of the bypass flow passage 38 can be changed, and the amount of a liquid flowing in the bypass flow passage 38 can be changed.

During the maintenance work or during filling of the liquid jetting heads 34-1, 34-2, . . . , and 34-16 with a liquid, the bypass flow passage 38 may be opened by the bypass flow passage valve 42 in order to remove air bubbles. The bypass flow passage 38 may be closed by the bypass flow passage valve 42 during printing.

In a case where the liquid circulation device 10 comprises a plurality of bypass flow passages 38, the bypass flow passage valve 42 capable of changing the resistance may be comprised in at least one bypass flow passage 38, and valves that only open and close the bypass flow passages 38 may be comprised in the other bypass flow passages 38.

Relationship Between Number of Head Modules of Print Bar and Resistance of Bypass Flow Passage FIGS. 8, 9, 10, and 11 are conceptual views related to a liquid to be circulated by the liquid circulation device 10.

In FIGS. 8 to 11, Pdiff indicates a differential pressure applied to each liquid jetting head 34 and each bypass flow passage 38 by the pressure of the supply side pump 24 (see FIG. 2) and the pressure of the collection side pump 66 (see FIG. 2), and a value thereof is constant herein. Vtotal is a total amount of liquids flowing in the respective liquid jetting heads 34 and the respective bypass flow passages 38. Rh1, Rh2, Rh3, . . . , and Rh16 are resistances of the liquid jetting heads 34-1, 34-2, 34-3, . . . , and 34-16 with respect to the liquids, respectively. The resistances of the liquid jetting heads 34-1, 34-2, 34-3, . . . , and 34-16 are resistances between the supply side manifold 30 (see FIG. 2) and the collection side manifold 60 (see FIG. 2) and include resistances of the liquid supply flow passage 32 (see FIG. 2), the liquid collection flow passage 36 (see FIG. 2), a connector connecting the flow passages, and the like.

As shown in FIGS. 8 to 11, in the liquid circulation device 10, since the plurality of liquid jetting heads 34 are connected in parallel, the amount of a liquid circulating in each liquid jetting head 34 does not depend on the resistances of the bypass flow passages 38, 38-1, and 38-2 and is determined only by Pdiff. On the other hand, Vtotal is affected by the resistances of the bypass flow passages 38, 38-1, and 38-2.

Vh1, Vh2, Vh3, . . . , and Vh16 are the amounts of liquids circulating in the liquid jetting heads 34-1, 34-2, 34-3, . . . , and 34-16, respectively. Rb, Rb1, and Rb2 are resistances of the bypass flow passages 38, 38-1, and 38-2 with respect to the liquids, respectively. Vb, Vb1, and Vb2 are the amounts of the liquids flowing in the bypass flow passages 38, 38-1, and 38-2, respectively.

Figure 8:
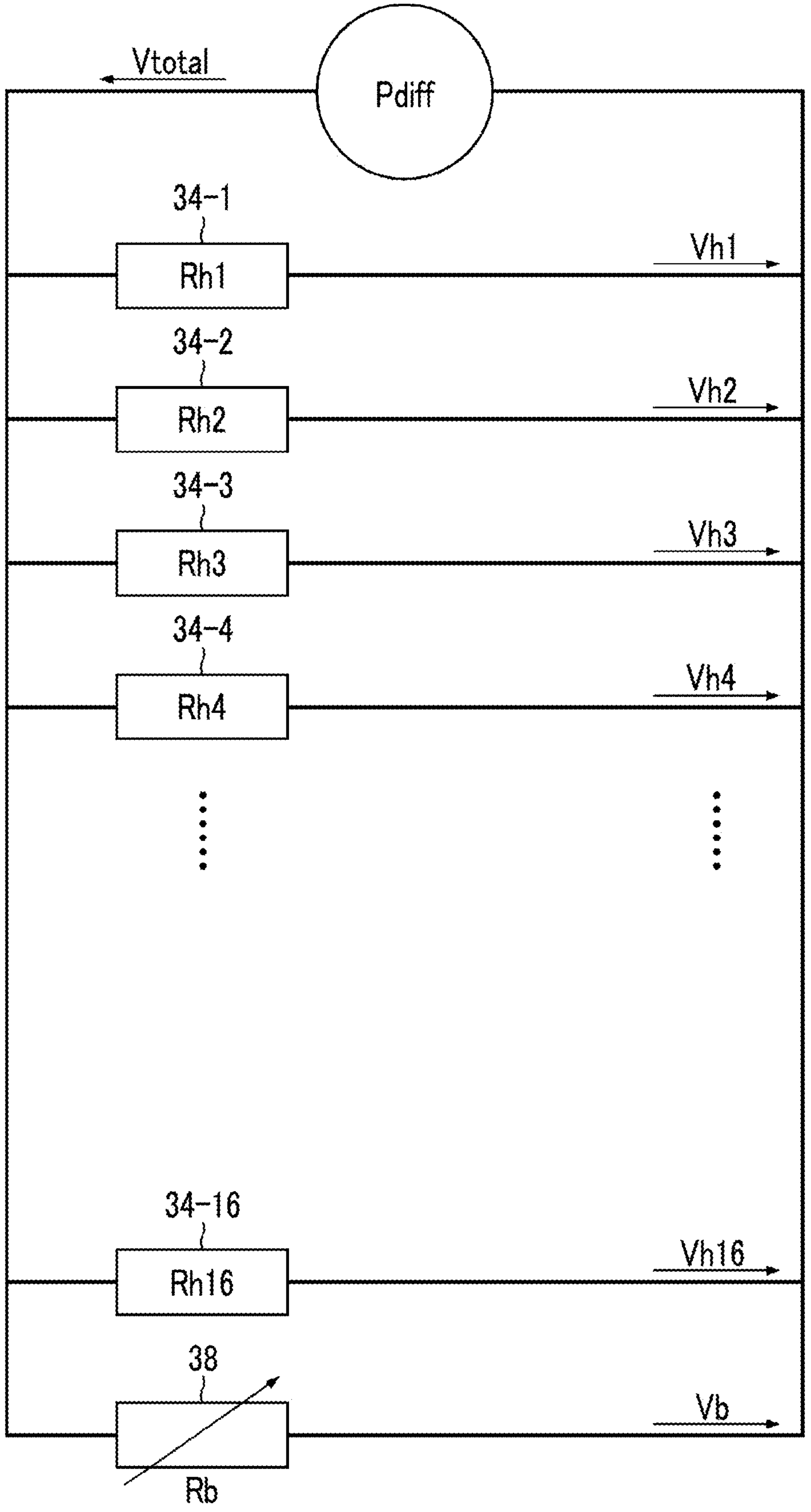
FIG. 8 is a conceptual view related to a liquid to be circulated by the liquid circulation device.

FIG. 8 shows a case where one bypass flow passage 38 is comprised and 16 liquid jetting heads 34-1, 34-2, . . . , and 34-16 are connected. That is, FIG. 8 shows a state where the four head modules 21 (see FIG. 5) are connected. FIG. 8 shows a state where the bypass flow passage valve 42 (see FIG. 2) is closed. That is, FIG. 8 shows a case where Rb is infinite and Vb is 0, that is, the liquid is not allowed to flow to the bypass flow passage 38. In this case, in a case where an average value of Vh1, Vh2, Vh3, . . . , and Vh16 is defined as Vh_ave, Vtotal is 16 times Vh_ave. The average value of Rh1, Rh2, Rh3, . . . , and Rh16 is defined as Rh_ave.

Figure 9:
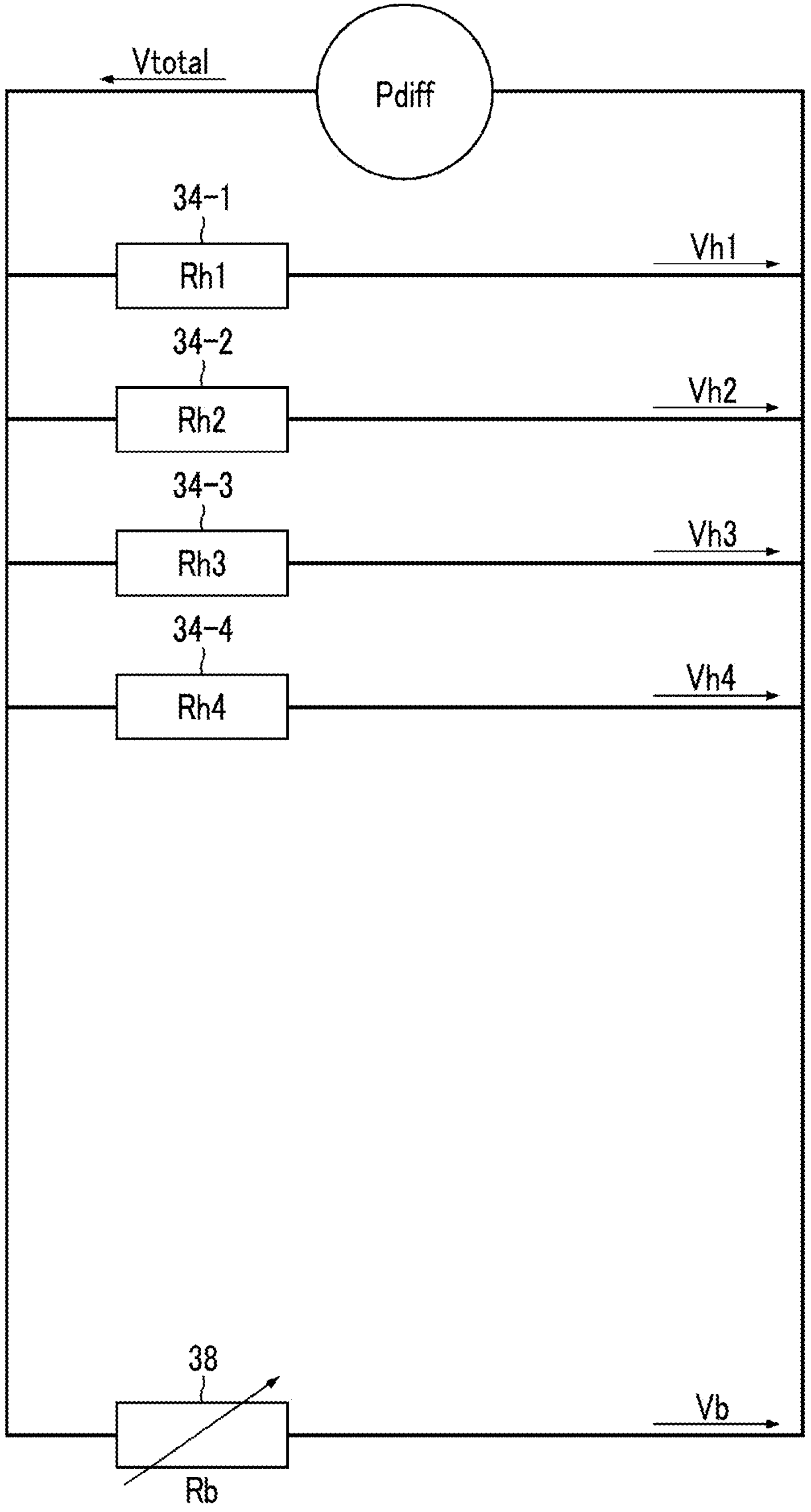
FIG. 9 is a conceptual view related to the liquid to be circulated by the liquid circulation device.

FIG. 9 shows a case where one bypass flow passage 38 is comprised and four liquid jetting heads 34-1, 34-2, 34-3, and 34-4 are connected. That is, FIG. 9 shows a state where one head module 21 is connected.

In FIGS. 8 and 9, the number of liquid jetting heads 34 is different, but it is considered that Vtotal is maintained in a case where Pdiff is constant. That is, it is desired that Vtotal of FIG. 9 is set to the same value as Vtotal of FIG. 8.

In this case, Rb may be set to 1/12 times Rh_ave. As a result, Vb is 12 times Vh_ave, and Vtotal can be adapted to Vtotal in the case of FIG. 8.

Figure 10:
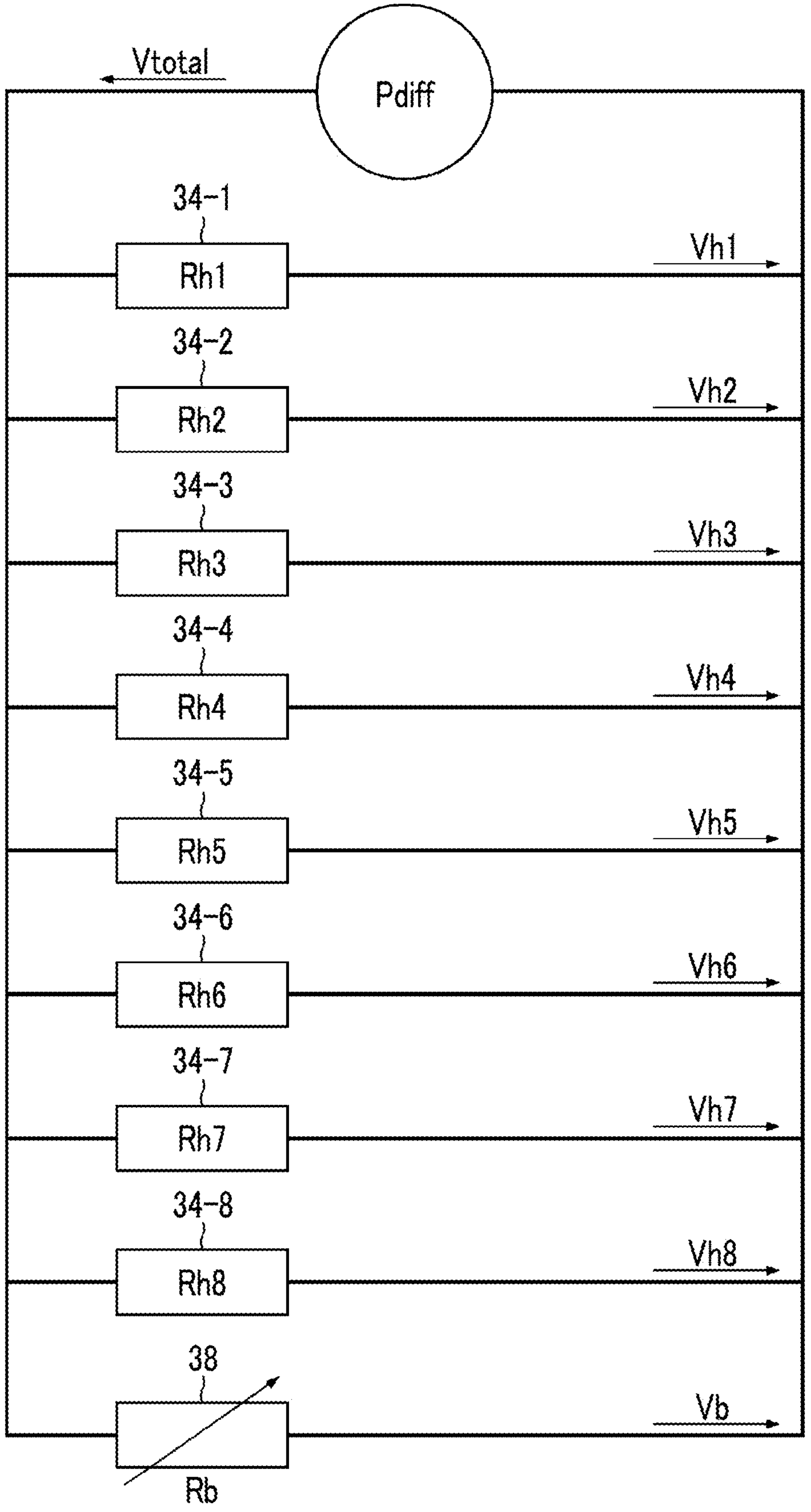
FIG. 10 is a conceptual view related to the liquid to be circulated by the liquid circulation device.

FIG. 10 shows a case where one bypass flow passage 38 is comprised and eight liquid jetting heads 34-1, 34-2, . . . , and 34-8 are connected. That is, FIG. 10 shows a state where two head modules 21 are connected.

As in the case of FIG. 9, it is considered that Vtotal is set to be the same as in FIG. 8 in a case where Pdiff is constant. That is, it is desired that Vtotal of FIG. 10 is set to the same value as Vtotal of FIG. 8.

In this case, Rb may be set to 1/8 times Rh_ave. As a result, Vb is 8 times Vh_ave, and Vtotal can be adapted to Vtotal in the case of FIG. 8.

In this manner, with n defined as an integer and m defined as an integer of 1 or more and less than n, Rb may be set to 1/(n−m) times Rh_ave in a case where m liquid jetting heads 34 are mounted on a print bar 40 of which the maximum number of mountable liquid jetting heads 34 is n (herein, n=16).

Figure 11:
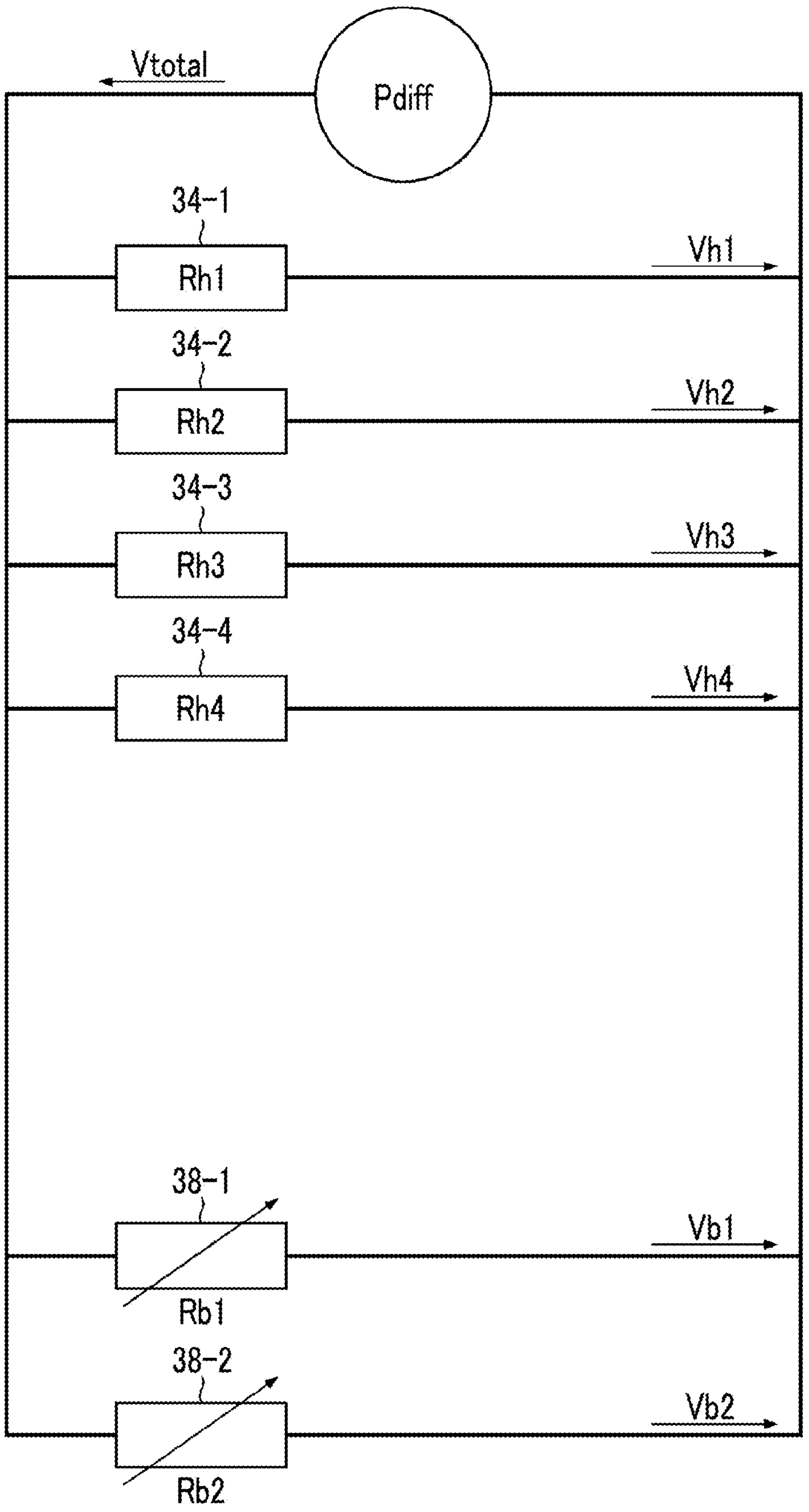
FIG. 11 is a conceptual view related to the liquid to be circulated by the liquid circulation device.

FIG. 11 shows a case where two bypass flow passages 38-1 and 38-2 are comprised and four liquid jetting heads 34-1, 34-2, . . . , and 34-4 are connected. As above, it is considered that Vtotal is set to be the same as in FIG. 8 in a case where Pdiff is constant. That is, it is desired that Vtotal of FIG. 11 is set to the same value as Vtotal of FIG. 8.

Herein, for example, Rb1 and Rb2 may be set to 1/8 times and 1/4 times Rh_ave, respectively. As a result, Vb1 and Vb2 are 8 times and 4 times Vh_ave, respectively, and Vtotal can be adapted to Vtotal in the case of FIG. 8. That is, in a case where there are a plurality of bypass flow passages 38, the resistance of each bypass flow passage 38 may be set such that the combined resistance of the respective bypass flow passages 38 is 1/(n−m) times Rh_ave.

As described above, in a case where a liquid is flowed to the bypass flow passage 38, with respect to a maximum number n of mountable liquid jetting heads 34, the resistance of the bypass flow passage 38 is 1/n times or more and 1 time or less the resistance of the liquid jetting head 34 with respect to the liquid.

Herein, although an example, in which Vtotal in a case where the maximum number (16) of mountable liquid jetting heads 34 are mounted on the print bar 40 and a liquid is not flowed to the bypass flow passage 38 is used as a reference, and Vtotal is maintained in a case where the number of liquid jetting heads 34 is changed, has been described, Vtotal in a case where the maximum number of mountable liquid jetting heads 34 is mounted on the print bar 40 and a constant amount of a liquid is flowed to the bypass flow passage 38 may be used as a reference. Also in this case, Vtotal can be maintained by adjusting the resistance of the bypass flow passage even in a case where the number of liquid jetting heads 34 is changed.

A resistance generated in the liquid supply flow passage 32, the liquid collection flow passage 36, and the connector connecting the flow passages can be neglected by making the resistance relatively smaller than the resistance of the liquid jetting head 34 through a method such as increasing the inner diameter of a pipe and using a connector having a small resistance.

In addition, in a case where the resistance of the bypass flow passage 38 is made excessively small, the amount of a liquid flowing in the bypass flow passage 38 is relatively large. As a result, the accuracy of pressure control may decreases in some cases due to fluctuations in a pressure loss. In this case, by providing the plurality of bypass flow passages 38 and adjusting the resistance of each bypass flow passage 38, a circulation amount of a liquid flowing in the liquid circulation device 10 can be kept constant. The resistances of the plurality of bypass flow passages 38 may be calculated as one combined resistance.

With the liquid circulation device 10, by changing the resistance of the bypass flow passage 38 such that the circulation amount of a liquid flowing in the liquid circulation device 10 is constant with the same pressure setting, even in a case where the number of head modules 21 is changed, an effect in which it is not necessary to change parameters of pressure control, pump control, and temperature control is achieved. That is, by changing the resistance of the bypass flow passage 38 according to the number of liquid jetting heads 34, the circulation amount of the liquid flowing in the liquid circulation device 10 can be adjusted to an appropriate value.

Second Embodiment

Fluctuations in Circulation Amount

The circulation amount of a liquid of the liquid circulation device 10 fluctuates in some cases due to an abnormality in a liquid supply system or deterioration of a pump.

In addition, operation states of the supply side pump 24 and the collection side pump 66 are detected in some cases in order to detect fluctuations in the circulation amount of a liquid of the liquid circulation device 10. For example, in a case where the supply side pump 24 and the collection side pump 66 are tube pumps, the fluctuations in the circulation amount of the liquid are detected by measuring the rotation speeds of the tube pumps.

In a case where the supply side pump 24 or the collection side pump 66 has deteriorated, the circulation amount with respect to the rotation speed decreases. For this reason, in a case where control is performed such that the circulation amount is constant, the rotation speed of a pump is increased, and thus it appears that the circulation amount has increased.

On the other hand, a case where the circulation amount of a liquid of the liquid circulation device 10 in a true sense increases includes liquid leakage and a decrease in the viscosity of the liquid. In addition, a case where the circulation amount of the liquid of the liquid circulation device 10 reduces includes generation of air bubbles, clogging, and an increase in the viscosity of the liquid in the circulation flow passage.

Configuration of Liquid Circulation Device

Figure 12:
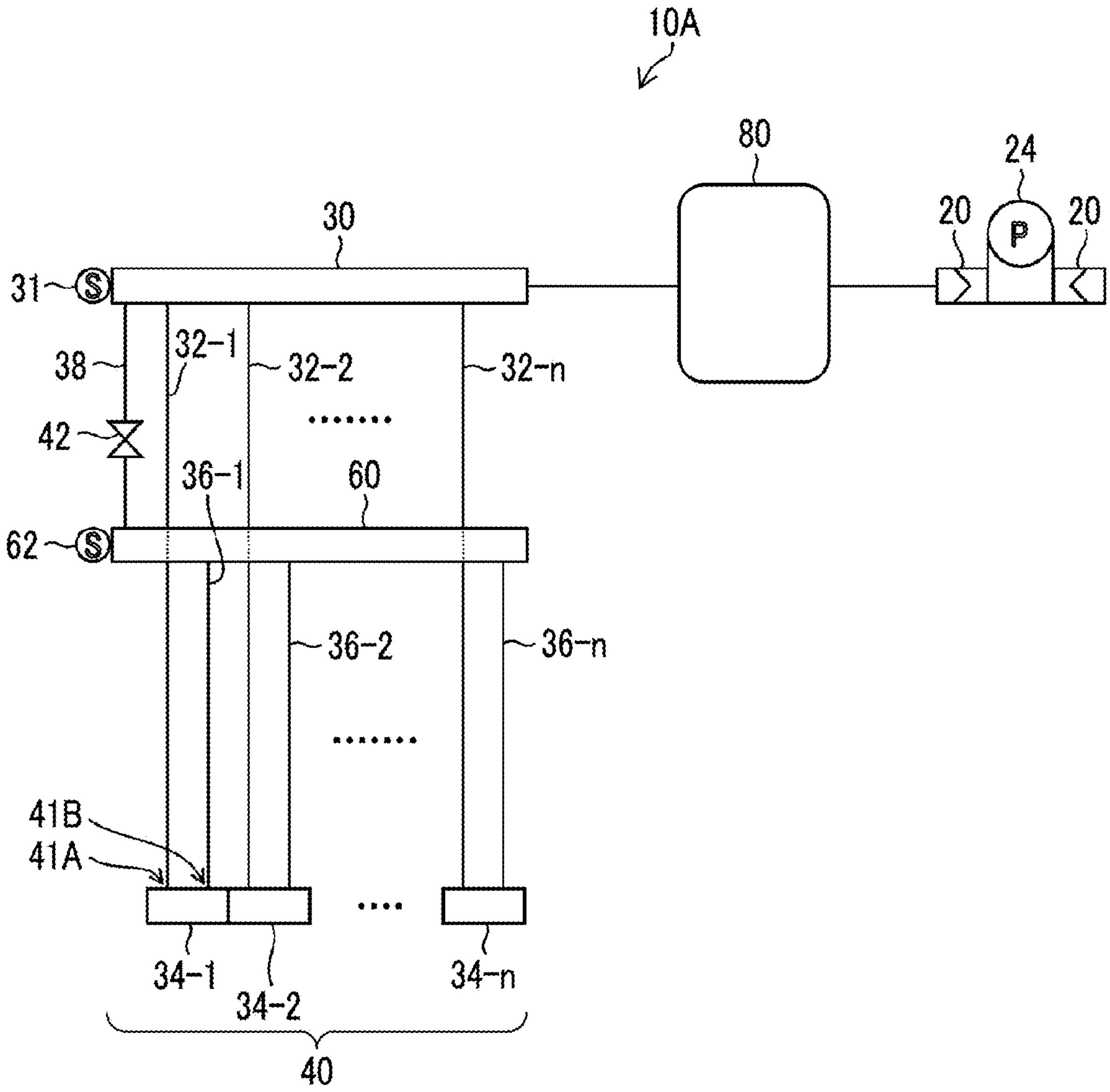
FIG. 12 is a configuration view of a liquid circulation device according to a second embodiment.

FIG. 12 is a configuration view of a liquid circulation device according to a second embodiment. As shown in FIG. 12, a liquid circulation device 10A comprises a flowmeter 80. Other configurations are the same as those of the liquid circulation device 10 shown in FIG. 2 and will not be shown.

The flowmeter 80 measures the amount of a liquid circulating in the liquid circulation device 10A. That is, the flowmeter 80 measures the amount of a liquid flowing in the supply side manifold 30 and/or the collection side manifold 60. A measuring method of the flowmeter 80 may be an ultrasonic type, an electromagnetic type, a Coriolis type, a thermal type, a Karman vortex type, an impeller type, a float type, or a differential pressure type. The flowmeter 80 may store measurement results as data. The data may be computer-readable. The stored data may be used after being subjected to statistical processing or the like.

Adjusting Method of Liquid Circulation Device

An adjusting method of the liquid circulation device 10A is adjusting the output value of the supply side pump 24 and the output value of the collection side pump 66 to be within ±5% of a value set in advance and preferably ±1% of the value set in advance.

Figure 13:
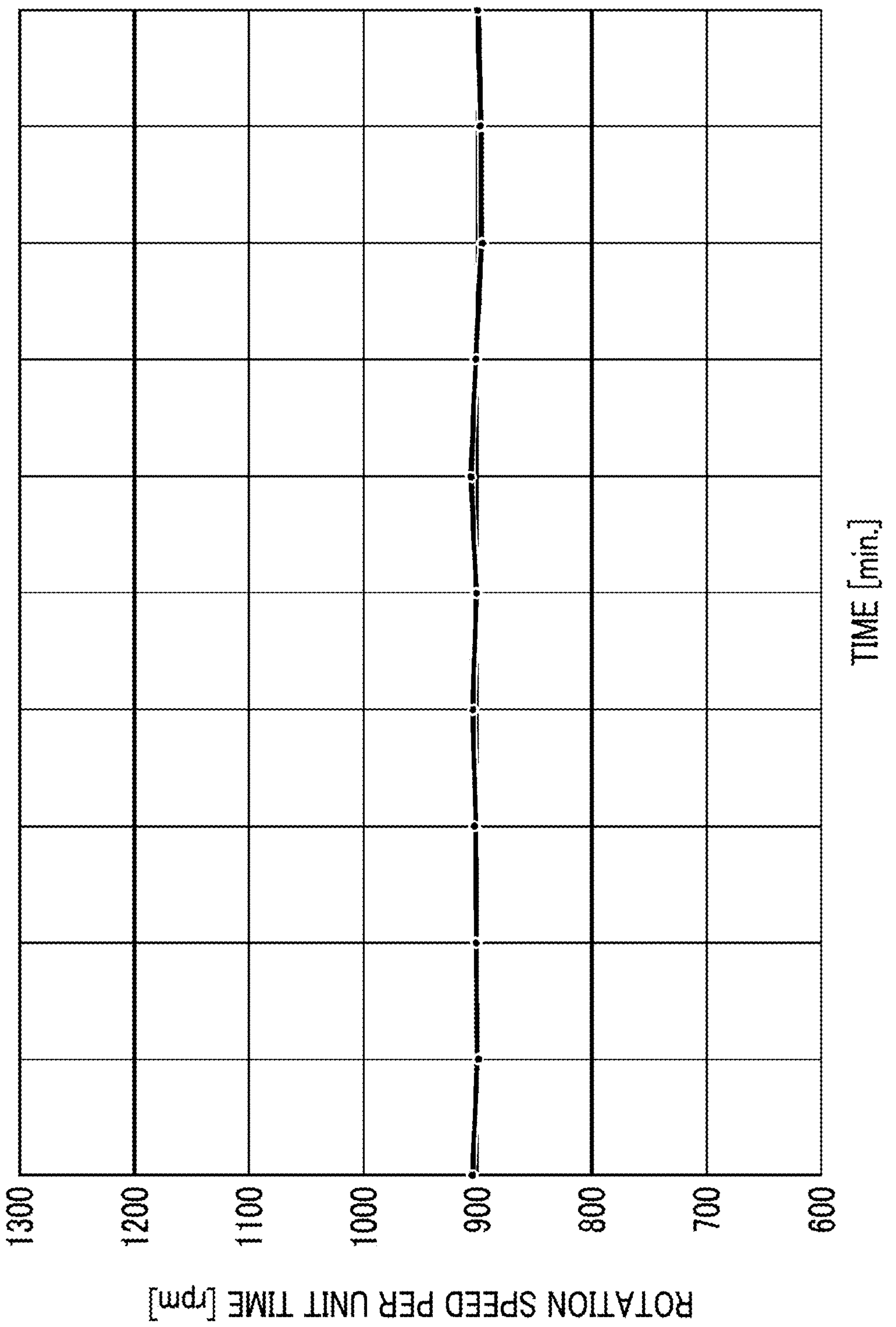
FIG. 13 is a graph showing a time variation of an output value of a supply side pump.

FIG. 13 is a graph showing a time variation of an output value of the supply side pump 24. In FIG. 13, the vertical axis indicates the rotation speed of the supply side pump 24 per unit time, and the unit is [revolutions per minute (rpm)]. In addition, in FIG. 13, the horizontal axis indicates time, and the unit is [minute]. That is, the output value of the supply side pump 24 is the rotation speed of the supply side pump 24 per unit time. Herein, the rotation speed of the supply side pump 24 per unit time is set to 1,000 rpm. A threshold value of an upper limit value is set to 1,200 rpm, and a threshold value of a lower limit value is set to 800 rpm as threshold values set for issuing a warning.

In the example shown in FIG. 13, the rotation speed of the supply side pump 24 per unit time is approximately 900 rpm, and the rotation speed of the supply side pump 24 per unit time is lower than the set value. In this case, since the rotation speed of the supply side pump 24 per unit time is close to the threshold value of the lower limit value, a lower limit warning is likely to be issued. On the other hand, since the rotation speed of the supply side pump 24 per unit time is far from the threshold value of the upper limit value, an upper limit warning is unlikely to be issued. For this reason, it is not easy to detect an abnormality from the rotation speed of the supply side pump 24 per unit time.

Returning to the description of FIG. 12, the adjusting method of the liquid circulation device 10A will be described with an example in which the number of liquid jetting heads 34 included in the print bar 40 is 16 and the number of bypass flow passages 38 is one. It is assumed that the actual output values of the supply side pump 24 and the collection side pump 66 are both 900 rpm in a case where the bypass flow passage 38 is closed by the bypass flow passage valve 42, and the rotation speeds of both the supply side pump 24 and the collection side pump 66 are set to 1,000 rpm. In this case, it is considered that the output values of the supply side pump 24 and the collection side pump 66 are smaller than the set value since the resistance of each liquid jetting head 34 is higher than the assumption.

Herein, in order to adjust the rotation speeds of the supply side pump 24 and the collection side pump 66 to 1,000 rpm, the resistance of the bypass flow passage 38 may be set such that a liquid corresponding to 100 rpm flows to the bypass flow passage 38. That is, since the circulation amount corresponds to approximately 60 rpm per one liquid jetting head 34, the resistance of the bypass flow passage 38 may be set to 60/100 of the resistance of one liquid jetting head 34.

Herein, approximate resistance values are shown, but the rotation speeds of the supply side pump 24 and the collection side pump 66 can be adjusted to 1,000 rpm, which is the set value and a target, by changing and adjusting the resistance of the bypass flow passage 38 in a state where a liquid temperature and the like are steady.

In addition, the rotation speed of a pump is used as the output value herein, but the amount of a liquid circulating in the liquid circulation device 10A may be used as the output value. The amount of the liquid circulating in the liquid circulation device 10A is measured by the flowmeter 80. By using the flowmeter 80, the deterioration of the supply side pump 24 and the collection side pump 66 can be distinguished from other problems.

As described above, the adjusting method of the liquid circulation device 10A includes a step of closing the bypass flow passage 38. Closing the bypass flow passage 38 is synonymous with closing the bypass flow passage valve 42 and making the resistance of the bypass flow passage 38 infinite.

In addition, the adjusting method of the liquid circulation device 10A includes a step of measuring an output value of a pump. The output value of the pump is, for example, the output value of the supply side pump 24 and the output value of the collection side pump 66. The output value of the supply side pump 24 and the output value of the collection side pump 66 are, for example, rotation speeds per unit time, respectively. Instead of the output value of the pump, the amount of a liquid circulating in the liquid circulation device 10A may be measured.

Further, the adjusting method of the liquid circulation device 10A includes a setting step of setting a resistance according to a measured output value. In the setting step, the resistance may be set based on the number of liquid jetting heads 34 for circulating the liquid.

It is preferable that the adjusting method of the liquid circulation device 10A is performed during start of use of the print bar 40, during replacement of the liquid jetting head 34, during replacement of the supply side pump 24, or during replacement of the collection side pump 66.

In the adjusting method of the liquid circulation device 10A, the output value of the supply side pump 24 and the output value of the collection side pump 66 can be adjusted to be within ±5% of the value set in advance and preferably within ±1% of the value set in advance without changing other parameters. As a result, an effect in which a range of a threshold value of abnormality detection can be narrowed is achieved.

Third Embodiment

A liquid circulation device according to a third embodiment detects an abnormality of the liquid circulation device by detecting that an output value of a pump has exceeded an upper limit value and a lower limit value which are set in advance. Herein, for example, the output value of the pump is detected using the flow rate of a liquid circulating in the liquid circulation device.

Configuration of Liquid Circulation Device

Figure 14:
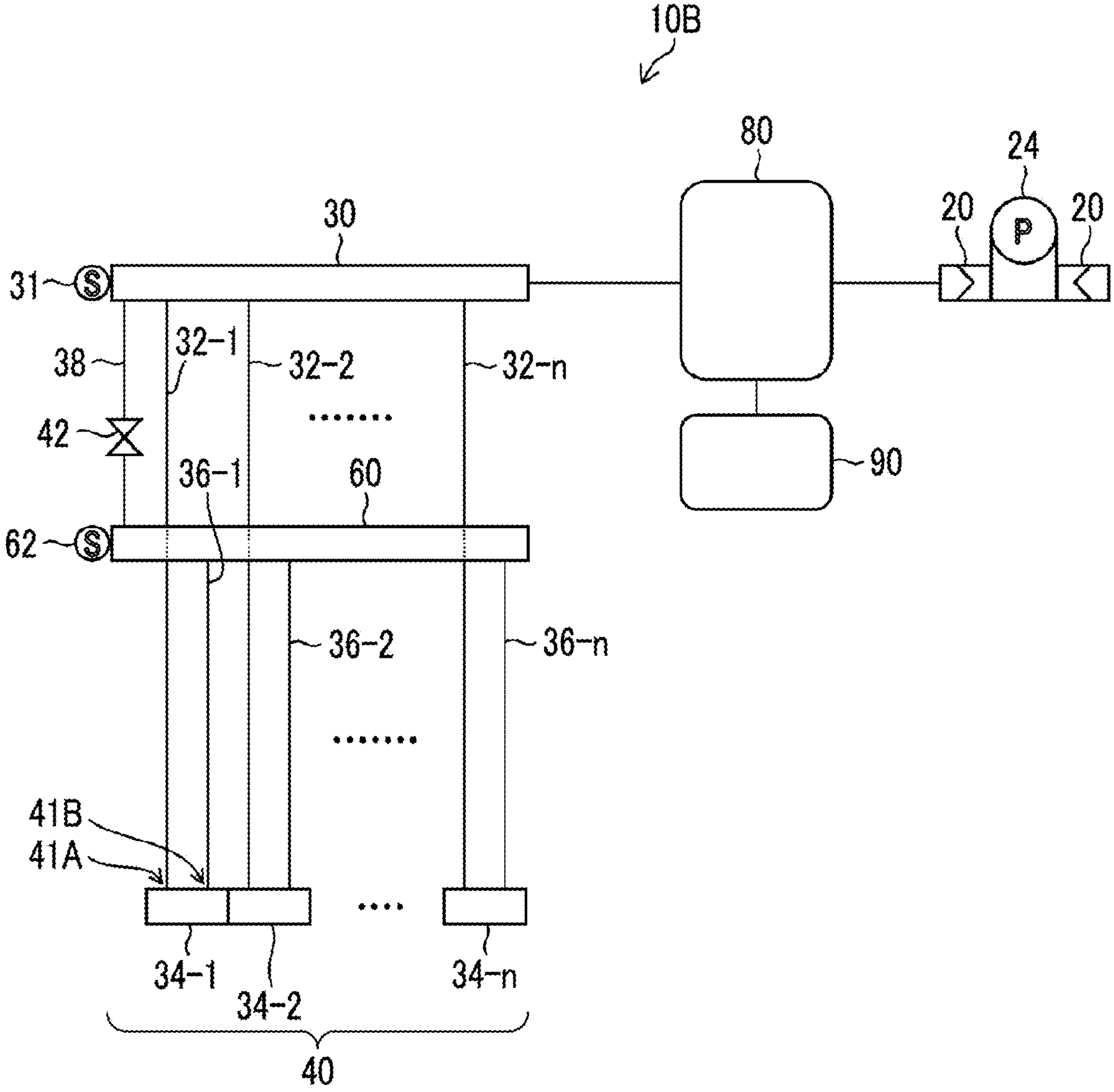
FIG. 14 is a configuration view of a liquid circulation device according to a third embodiment.

FIG. 14 is a configuration view of the liquid circulation device according to the third embodiment. As shown in FIG. 14, a liquid circulation device 10B comprises a notification device 90. Other configurations are the same as those of the liquid circulation device 10A shown in FIG. 12.

The notification device 90 is connected to the flowmeter 80. The notification device 90 notifies that the flow rate has exceeded a threshold value determined in advance based on a measurement result of the flowmeter 80. The threshold value is, for example, ±20% of the flow rate determined in advance and is preferably ±10% of the flow rate determined in advance. The notification device 90 notifies a user, such as a design worker, a person around, and a worker who performs printing or maintenance work, of a warning by displaying the warning on a screen, generating a warning sound, outputting a log related to the warning, and transmitting an e-mail related to the warning via a communication line.

It is desirable that a numerical value of +5% or preferably +1% of a value set in advance is set as the upper limit value of the flow rate. In addition, it is desirable that a numerical value of −5% or preferably −1% of the value determined in advance is set as the lower limit value of the flow rate. In a case where the flow rate has reached the threshold value, the notification device 90 issues a warning. With the liquid circulation device 10B, an effect in which the user can be notified of an abnormality of the liquid circulation device 10B is achieved.

Herein, the notification device 90 has notified that the flow rate has exceeded the threshold value, but may notify that the rotation speed of the supply side pump 24 per unit time has exceeded the threshold value.

Manufacturing Method of Image Forming Apparatus

A manufacturing method of the image forming apparatus 100 is the manufacturing method of the image forming apparatus 100 comprising the print bar 40 on which the liquid jetting head 34 that jets a liquid is mounted, the print bar 40 of which a maximum number of mountable liquid jetting heads 34 is an integer n, the supply side manifold 30 that supplies the liquid to the print bar 40, the collection side manifold 60 that collects the liquid from the print bar 40, the bypass flow passage 38 that causes the supply side manifold 30 to communicate with the collection side manifold 60 without going via the print bar 40, the bypass flow passage 38 being capable of changing a resistance with respect to the liquid, and the supply side pump 24 that generates a differential pressure between the supply side manifold 30 and the collection side manifold 60.

In addition, the manufacturing method of the image forming apparatus 100 includes a step of mounting m liquid jetting heads 34 on the print bar 40 in a case where m is defined as an integer of 1 or more and less than n. That is, the user mounts the m liquid jetting heads 34 on the print bar 40 and connects the print bar 40 to the liquid circulation device 10. The number of liquid jetting heads 34 may be determined according to the width of the printing medium 1. The user may mount the liquid jetting heads 34 by the head module 21.

Further, the manufacturing method of the image forming apparatus 100 includes a step of setting the resistance of the bypass flow passage 38 to 1/(n−m) of the resistance of the liquid jetting head. That is, the user sets the resistance of the bypass flow passage 38 to 1/(n−m) of the resistance of the liquid jetting head with the bypass flow passage valve 42. The resistance of the liquid jetting head may be an average value of the resistances of the plurality of liquid jetting heads 34. In a case where the plurality of bypass flow passages 38 are provided, the user may set the combined resistance of the plurality of bypass flow passages 38 to 1/(n−m) of the resistance of the liquid jetting head.

Electric Configuration of Image Forming Apparatus

Figure 15:
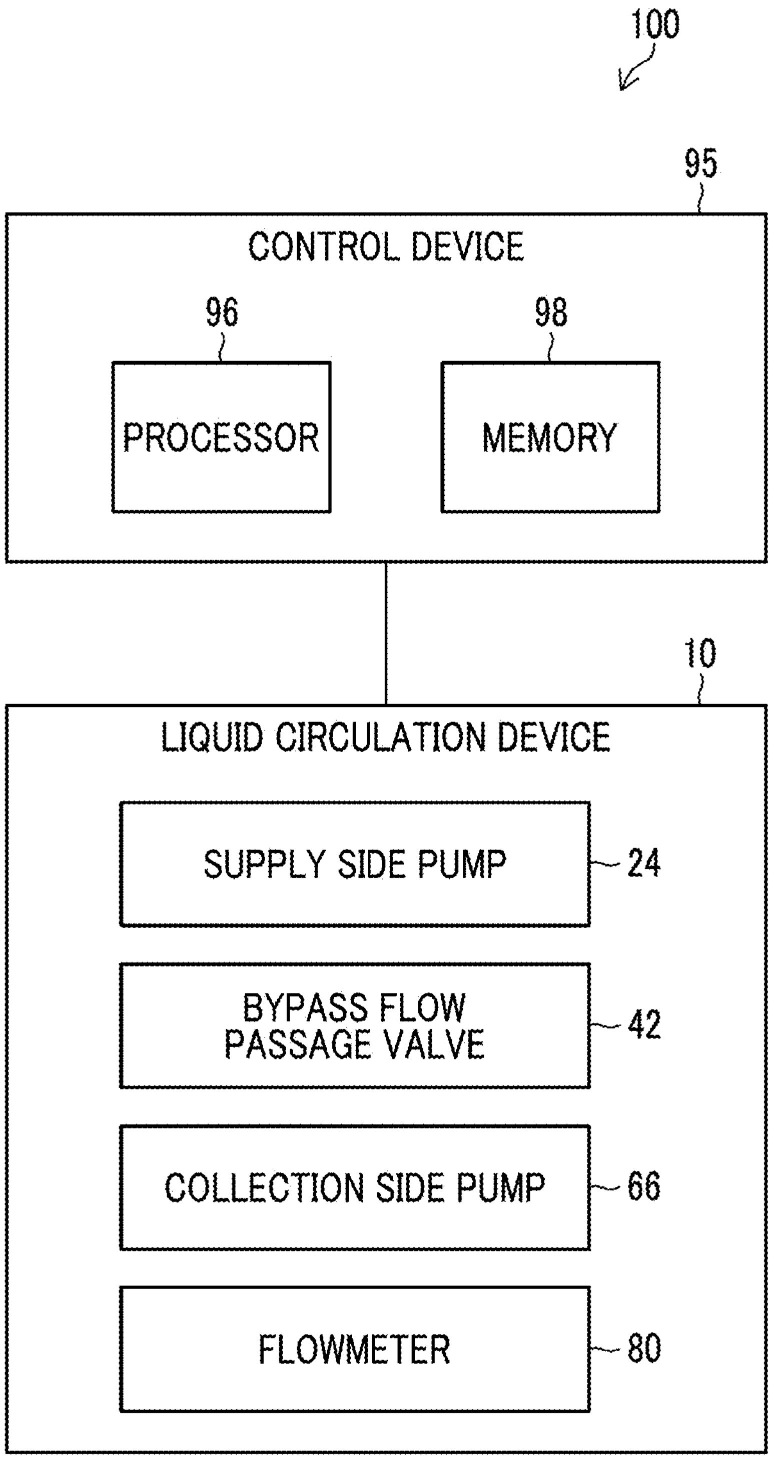
FIG. 15 is a functional block diagram showing an electric configuration of the image forming apparatus.

FIG. 15 is a functional block diagram showing an electric configuration of the image forming apparatus. The image forming apparatus 100 comprises a control device 95. The control device 95 comprises a processor 96 and a memory

98. The control device 95 controls the bypass flow passage valve 42, the supply side pump 24, and the collection side pump 66 of the liquid circulation device 10. The control device 95 may control the notification device 90. In addition, the control device 95 acquires measurement results of the flowmeter 80.

A hardware structure of the processor 96 includes various types of processors described below. The various types of processors include a central processing unit (CPU) that is a general-purpose processor which acts as various types of functional units by executing software (program), a graphics processing unit (GPU) that is a processor specialized in image processing, a programmable logic device (PLD) that is a processor of which a circuit configuration is changeable after manufacture, such as a field programmable gate array (FPGA), and a dedicated electric circuit that is a processor which has a circuit configuration specifically designed in order to execute specific processing, such as an application specific integrated circuit (ASIC).

One processing unit may be composed of one of the various types of processors or may be composed of two or more processors of the same type or different types (for example, a plurality of FPGAs, a combination of a CPU and a FPGA, or a combination of a CPU and an GPU). In addition, one processor may constitute a plurality of functional units. As an example in which the one processor constitutes the plurality of functional units, first, there is a form in which a combination of one or more CPUs and software constitutes one processor, as represented by a computer, such as a client and a server, and the processor acts as the plurality of functional units. Second, there is a form in which a processor that realizes functions of the entire system including the plurality of functional units with one integrated circuit (IC) chip is used, as represented by a system on a chip (SoC) or the like. As described above, the various types of functional units are composed of one or more of the various types of processors used as a hardware structure.

Further, the hardware structure of the various types of processors is, more specifically, an electric circuit (circuitry) in which circuit elements such as semiconductor elements are combined.

The memory 98 stores a command to be executed by the processor 96. The memory 98 includes a random access memory (RAM) (not shown) and a read only memory (ROM) (not shown). The processor 96 executes various types of processing of the image forming apparatus 100 by using the RAM as a work region, executing software by using various types of programs and parameters stored in the ROM, and using the parameters stored in the ROM and the like.

Others

The adjusting method of a liquid circulation device and the manufacturing method of an image forming apparatus can be configured as a program for causing the computer to realize each step and can constitute a non-temporary storage medium such as a compact disk-read only memory (CD-ROM) storing the program.

The technical scope of the present invention is not limited to the scope described in the embodiments. The configuration and the like in each embodiment can be combined between the embodiments as appropriate without departing from the gist of the present invention.

EXPLANATION OF REFERENCES

1: printing medium
10: liquid circulation device
10K: liquid circulation device
10C: liquid circulation device
10M: liquid circulation device
10Y: liquid circulation device
10W: liquid circulation device
12: liquid tank
12A: supply port
12B: collection port
14: supply side flow passage
16: collection side flow passage
18I: joint
18O: joint
20: joint
21: head module
22: degassing module
24: supply side pump
26: supply side filter
28: supply side back-pressure tank
28A: liquid inlet
28B: liquid outlet
28C: liquid chamber
28D: gas chamber
28E: elastic film
30: supply side manifold
31: supply side pressure sensor
32: liquid supply flow passage
34: liquid jetting head
36: liquid collection flow passage
38: bypass flow passage
40: print bar
40K: print bar
40C: print bar
40M: print bar
40Y: print bar
40W: print bar
41A: liquid supply port
41B: liquid collection port
42: bypass flow passage valve
60: collection side manifold
62: collection side pressure sensor
64: collection side back-pressure tank
66: collection side pump
68: collection side filter
72: one-way valve
80: flowmeter
90: notification device
95: control device
96: processor
98: memory
100: image forming apparatus
120: transport device
122: pass roller
130: feeding device
132: feeding roll
140: pretreatment liquid coating device
142: coating roller
144: opposing roller
146: pretreatment liquid drying device
150: liquid applying device
152: printing drum
154: scanner
170: drying device
172: drying drum
180: winding device
182: winding roll
200: nozzle surface
202: nozzle 204: pressure chamber
208: supply stop
210: supply tributary
212: common flow passage
214: downcomer
216: liquid circulation path
218: collection tributary
220: circulation common flow passage
228: actuator
230: nozzle plate
232: flow passage plate

What is claimed is:

1. A liquid circulation device comprising:

a supply side manifold that supplies a liquid to a print bar on which one or more liquid jetting heads jetting the liquid are mounted;

a collection side manifold that collects the liquid from the print bar; and a bypass flow passage that causes the supply side manifold to communicate with the collection side manifold without going via the print bar, wherein the liquid circulates in the liquid jetting head due to a differential pressure between the supply side manifold and the collection side manifold, and the bypass flow passage is capable of changing a resistance with respect to the liquid, wherein the resistance of the bypass flow passage is adjusted such that a total circulation amount of the liquid flowing in the liquid circulation device is constant with a same pressure setting.

2. The liquid circulation device according to claim 1, wherein the print bar includes a plurality of the liquid jetting heads, and the plurality of liquid jetting heads are disposed along one direction.

3. The liquid circulation device according to claim 1, wherein in a case where a maximum number of the liquid jetting heads mountable on the print bar is defined as an integer n, the resistance of the bypass flow passage is 1/n times or more and 1 time or less a resistance of the liquid jetting head with respect to the liquid.

4. The liquid circulation device according to claim 1, wherein the resistance of the bypass flow passage is changed according to the number of the liquid jetting heads.

5. The liquid circulation device according to claim 1, further comprising:

a pump that generates the differential pressure between the supply side manifold and the collection side manifold, wherein the resistance of the bypass flow passage is changed according to an output value of the pump.

6. The liquid circulation device according to claim 1, further comprising:

a flowmeter that measures a flow rate of the liquid flowing to the supply side manifold, wherein the resistance of the bypass flow passage is changed according to the measured flow rate.

7. The liquid circulation device according to claim 1, further comprising:

a pump that generates the differential pressure between the supply side manifold and the collection side manifold, wherein the resistance of the bypass flow passage is changed such that an output value of the pump is set to a value within ±5% of an output value determined in advance.

8. The liquid circulation device according to claim 1, further comprising:

a pump that generates the differential pressure between the supply side manifold and the collection side manifold; and a flowmeter that measures an amount of the liquid flowing to the supply side manifold and/or the collection side manifold, wherein the resistance of the bypass flow passage is changed such that a flow rate of the liquid is set to a value within ±5% of a flow rate determined in advance.

9. The liquid circulation device according to claim 8, further comprising:

a notification device that gives a notification that a flow rate of the liquid flowing to the supply side manifold has exceeded a threshold value determined in advance.

10. The liquid circulation device according to claim 1, wherein the bypass flow passage includes a bypass flow passage valve, and the resistance of the bypass flow passage is changed by the bypass flow passage valve.

11. A manufacturing method of an image forming apparatus including a print bar on which a liquid jetting head jetting a liquid is mounted and of which a maximum number of mountable liquid jetting heads is an integer n, a supply side manifold that supplies the liquid to the print bar, a collection side manifold that collects the liquid from the print bar, a bypass flow passage that causes the supply side manifold to communicate with the collection side manifold without going via the print bar and that is capable of changing a resistance with respect to the liquid, and a pump that generates a differential pressure between the supply side manifold and the collection side manifold, the manufacturing method comprising:

mounting m liquid jetting heads on the print bar in a case where m is defined as an integer of 1 or more and less than n; and setting the resistance to 1/(n−m) of a resistance of the liquid jetting head, wherein the resistance of the bypass flow passage is adjusted such that a total circulation amount of the liquid flowing in the liquid circulation device is constant with a same pressure setting.

12. An adjusting method of a liquid circulation device including a supply side manifold that supplies a liquid to a print bar on which a liquid jetting head jetting the liquid is mounted, a collection side manifold that collects the liquid from the print bar, a bypass flow passage that causes the supply side manifold to communicate with the collection side manifold without going via the print bar and that is capable of changing a resistance with respect to the liquid, and a pump that generates a differential pressure between the supply side manifold and the collection side manifold, the adjusting method comprising:

closing the bypass flow passage;

measuring an output value of the pump; and setting the resistance according to the output value, wherein the resistance of the bypass flow passage is adjusted such that a total circulation amount of the liquid flowing in the liquid circulation device is constant with a same pressure setting.

* * * * *